United States Patent
Penta et al.

(10) Patent No.: US 12,373,506 B1
(45) Date of Patent: Jul. 29, 2025

(54) PERSONALIZED RETRIEVAL-AUGMENTED GENERATION SYSTEM

(71) Applicant: Dropbox, Inc., San Francisco, CA (US)

(72) Inventors: Anthony Penta, Bellevue, WA (US); Ashok Pancily Poothiyot, San Francisco, CA (US); Geoff Hulten, Lynnwood, WA (US); Ameya Bhatawdekar, Issaquah, WA (US); Tim Gasser, Austin, TX (US); Sateesh Srinivasan, Redwood City, CA (US); Vasanth Krishna Namasivayam, Danville, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/744,393

(22) Filed: Jun. 14, 2024

Related U.S. Application Data

(60) Provisional application No. 63/624,191, filed on Jan. 23, 2024.

(51) Int. Cl.
*G06F 16/9535* (2019.01)
*G06F 16/907* (2019.01)

(52) U.S. Cl.
CPC ........ *G06F 16/9535* (2019.01); *G06F 16/907* (2019.01)

(58) Field of Classification Search
CPC ............................ G06F 16/9535; G06F 16/907
See application file for complete search history.

(56) References Cited

U.S. PATENT DOCUMENTS

| | | |
|---|---|---|
| 11,106,868 B2 | 8/2021 | Yadav et al. |
| 11,132,512 B2 | 9/2021 | Wu et al. |
| 11,210,306 B2 | 12/2021 | Steedman Henderson et al. |
| 2021/0097374 A1* | 4/2021 | Liu ..................... G06F 16/9535 |
| 2022/0382979 A1 | 12/2022 | Klein et al. |
| 2023/0162481 A1 | 5/2023 | Yuan et al. |
| 2023/0350978 A1* | 11/2023 | Zilka ..................... G06N 3/098 |
| 2023/0360388 A1 | 11/2023 | Singh |
| 2023/0385085 A1 | 11/2023 | Singh |
| 2024/0370339 A1* | 11/2024 | Statton ................. G06F 16/148 |

FOREIGN PATENT DOCUMENTS

WO 2023160472 A1 8/2023

* cited by examiner

*Primary Examiner* — Grace Park
(74) *Attorney, Agent, or Firm* — Keller Preece PLLC

(57) ABSTRACT

The present disclosure relates to systems, non-transitory computer-readable media, and methods for generating personal responses through retrieval-augmented generation. In particular, the disclosed systems can generate a query embedding from a query generated by an entity and determine data context specific to the entity by comparing the query embedding with a plurality of vectorized segments of content items associated with the entity. The disclosed systems can provide the data context to a large language model and generate a personalized response informed by the data context. Subsequently, the disclosed systems can provide the personalized response for display on a client device associated with the entity.

20 Claims, 9 Drawing Sheets

PERSONALIZED RETRIEVAL-AUGMENTED GENERATION SYSTEM

CROSS-REFERENCE TO RELATED APPLICATIONS

This application claims priority to and the benefit of U.S. Provisional Patent Application No. 63/624,191, filed on Jan. 23, 2024, which is incorporated herein by reference in its entirety.

BACKGROUND

Recent years have seen significant developments in artificial intelligence (AI) software and usage of large language models. Indeed, the increased popularity of large language models and the ever-evolving context of the internet has led to AI, and more specifically to large language models generating, summarizing, translating, and classifying digital content. For example, large language models can perform tasks ranging from summarizing notes to generating images. Based on these capabilities, some existing systems integrate large language models into programming architecture, data analysis pipelines, or other data processing systems. For example, some existing systems utilize retrieval-augmented generators (RAGs) to retrieve information and generate responses to queries. Despite these advances, some existing systems exhibit a number of problems in relation to accuracy and flexibility.

As just mentioned, many existing retrieval-augmented generation systems are inaccurate. Specifically, existing RAGs often generate inaccurate content based on their overgeneralized knowledge base used to train large language models. For example, many existing RAGs depend on a wide-ranging database that includes vast amounts of data across a huge variety of topics and fields. If the database is incomplete, biased, or lacks quality, the RAG generates inaccurate and irrelevant responses. Moreover, existing RAGs utilize large language models that are trained over enormous databases of common general data to achieve broad coverage of output generation across a wide array of contexts. Unfortunately, a consequence of such wide-ranging and generalized training (on sometimes biased data) is that the resulting large language models often hallucinate, generating erroneous, irrelevant, or incorrect responses (or other outputs) that the models treat as true. Without ways to remediate the inaccurate outputs generated by existing large language models, many conventional RAGs produce unreliable outputs, which negatively affect downstream analysis and/or use of such outputs.

In addition to their inaccurate analysis, existing RAGs suffer from inflexibility. More specifically, some existing RAGs employ a one-size-fits all framework that does not adapt to the specific needs of a particular user account. For example, as indicated above, some conventional RAGs utilize a framework and/or large language model that cannot adapt to or accurately perform certain tasks on a per-user-account basis. Moreover, such existing systems do not have contextual knowledge of certain user accounts and thus, cannot generate tailored outputs.

These along with additional problems and issues exist with regard to conventional large language model systems.

SUMMARY

Embodiments of the present disclosure provide benefits and/or solve one or more of the foregoing or other problems in the art with systems, non-transitory computer readable media, and methods for generating personalized responses for a specific entity by utilizing a finely tuned and personalized retrieval-augmented generation (RAG) framework. More specifically, the architecture of the personalized RAG includes a personalized embedding model, a vector database, one or more data context(s), and a large language model to generate a personalized response for an entity. For example, the disclosed systems can receive a query from an entity and can create an embedding of the query. In some embodiments, the disclosed systems can compare the query embedding with content items associated with the entity stored in a database. In particular, the disclosed systems can compare the query embedding with vectorized segments of the content items associated with the entity. Based on the comparison, the disclosed systems can determine data context(s) specific to the entity and provide the data context(s) and the query to a large language model. Subsequently, the large language model can generate a personalized response informed by the data context and provide for display the personalized response on a client device.

Additional features and advantages of one or more embodiments of the present disclosure are outlined in the description which follows, and in part can be determined from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
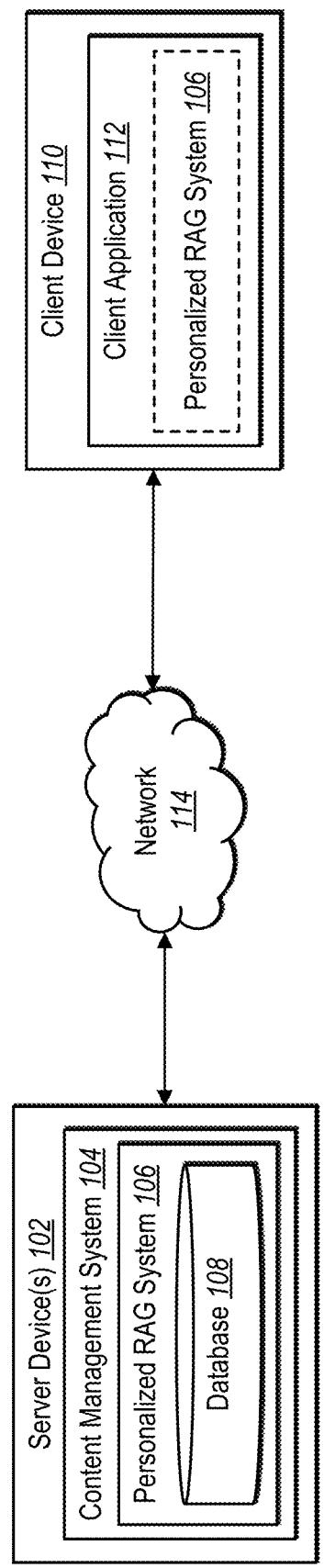
FIG. 1 illustrates a diagram of an environment in which a personalized retrieval-augmented generation system can operate in accordance with one or more embodiments.

This disclosure describes one or more embodiments of a personalized retrieval-augmented generation system that generates a personalized response to a query for an entity by updating elements of a personalized retrieval-augmented generation model. In many scenarios, systems utilize foundation models (FMs) as a basis for generating responses to natural language queries. Foundation models are large language models (LLMs) trained on unlabeled text from billions (or more) of documents to predict the next word in a sentence. Such models can be fine-tuned for a specific task, such as generating instructions or communicating in a question-response chat interaction. As opposed to the generic foundation models of prior systems, the personalized retrieval-augmented generation system described herein trains and utilizes a specific type of foundation model—a retrieval-augmented generation model—that is personalized on a per-entity basis by fine-tuning large language models to specific data contexts relating to user accounts, data stored for user accounts, and/or specific software applications.

Using such a personalized retrieval-augmented generation model, in some embodiments, the personalized retrieval-augmented generation system generates a personalized response for an entity (e.g., a user account, an enterprise, or an organization). Specifically, the personalized retrieval-augmented generation system generates a personalized response by determining a data context for a query (where the data context is specific to the query, the entity providing the query, and/or a computing environment for processing the query) and providing the query along with the data context to a large language model. For instance, the personalized retrieval-augmented generation system combines the query with the data context into a hybrid context-query prompt that includes both the query and the data context. The personalized retrieval-augmented generation system thus causes the large language model to process the input prompt and generate a personalized response specific to the data context.

The personalized retrieval-augmented generation system can determine a data context for generating a personalized response by comparing a query embedding with vectorized segments of content items. For instance, the personalized retrieval-augmented generation system determines a data context specific to the entity by comparing the query embedding with a plurality of vectorized segments of content items associated with the entity stored in a database. Subsequently, the personalized retrieval-augmented generation system can generate a personalized response by providing the data context and the query to a large language model. Additionally, the personalized retrieval-augmented generation system can display the personalized response on a client device associated with the entity.

Additionally, the personalized retrieval-augmented generation system can fine tune and/or personalize each of the elements associated with the personalized retrieval-augmented generation model. For example, the personalized retrieval-augmented generation system can fine-tune the query, the embedding model, the vector database, the data contexts, and/or the large language model so that the personalized retrieval-augmented generation system generates a personalized response that considers the context and environment of the entity. To illustrate, in one or more embodiments, the personalized retrieval-augmented generation system can include a component that augments a query before inputting the query into the embedding model. Such augmentation improves the quality and relevancy of the prompt for a given entity or group within an organization by providing the intent of the query to the large language model. The personalized retrieval-augmented generation system can perform fine-tuning based on feedback after generating a response. Indeed, the personalized retrieval-augmented generation system can update components of the model based on negative feedback (e.g., no interaction with the generated response or deleting the response) or positive feedback (e.g., interaction to use the generated response).

The personalized retrieval-augmented generation system provides a variety of technological advantages relative to conventional systems. For example, the personalized retrieval-augmented generation system can improve the accuracy of generating responses to queries utilizing RAGs and/or large language models. Specifically, while prior systems are sometimes overly reliant on large language models that are trained on generalized data, the personalized retrieval-augmented generation system inputs data specifically relevant to (and stored for) an entity into the large language model. As opposed to existing systems whose models are prone to hallucination, especially when facing domain shifts, the personalized retrieval-augmented generation system can accommodate for gaps between training data and content items associated with an entity by fine tuning the embedding model. For example, the personalized retrieval-augmented generation system can improve the performance of one or more embedding models so that they better capture the semantics of terms and/or content sources associated with an entity. Moreover, the personalized retrieval-augmented generation system can fine-tune each component with the personalized retrieval-augmented generation model. For example, the personalized retrieval-augmented generation system can fine-tune and augment the query, so that the personalized retrieval-augmented generation system finds the most relevant content items associated with an entity and feeds segments of those content items into the large language model.

Additionally, the personalized retrieval-augmented generation system provides improved flexibility over prior systems. For instance, unlike existing systems that fail to consider or learn about the context surrounding an entity, the personalized retrieval-augmented generation system can generate personalized responses tailored to the entity. For example, the personalized retrieval-augmented generation system can adapt to the changes, habits, features, content items, queries, and/or goals of an entity while generating the personalized response. Indeed, the personalized retrieval-augmented generation system can flexibly update one or more elements of a personalized retrieval-augmented generation model to improve the accuracy, relevance, and/or quality of the personalized response for the entity.

As illustrated by the foregoing discussion, the present disclosure utilizes a variety of terms to describe features and advantages of the field object generation system. Additional detail is now provided regarding the meaning of such terms. For example, as used herein, the term "digital content item" (or simply "content item") refers to a digital object or a digital file that includes information interpretable by a computing device (e.g., a client device) to present information to a user. A digital content item can include a file or a folder such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is siloed to a particular computer application but is not necessarily accessible via a file system or via a network connection. A digital content item can be editable or otherwise modifiable and can also be sharable from one user account (or client device) to another. In some cases, a digital content item is modifiable by multiple user accounts (or client devices) simultaneously and/or at different times. In one or more implementations a digital content item can correspond to a specific entity, group, and/or individual.

As used herein the term "query" refers to a prompt or question outlining a task or action. For example, a query can include text data (and/or image data or some other data) directing a RAG and/or large language model to perform a specific task (e.g., data retrieval, data summarization, content generation). In some embodiments, a query is an instruction given in natural language. In other embodiments, a query can include an image or code or be structured based. For example, in some cases, a query can utilize Python to achieve a specific task. In one or more embodiments, a query can be a combination of query types.

As used herein, the term "embedding model" refers to a model for extracting or encoding embeddings from queries or prompts. For example, an embedding model can include a machine learning model, such as a neural network, that learns how to (and extracts embeddings to) represent words, phrases, and/or documents from a query or prompt within a continuous vector space.

As used here in the term "query embedding" refers to a representation of a query within a continuous vector space. In particular, a query embedding can be a numeric or vector representation of the text, semantic meaning, lexical meaning and/or relationship of the query. In some cases, a query embedding maps the query to a vector of real numbers. In one or more embodiments, a query embedding can include multiple vectors representing aspects of the query.

As used herein, the term "vector database" refers to a storage database or repository for query embeddings as well as vectorized content items in embedding form. In one or more embodiments, a vector database can store embeddings for many types of content items, such as but not limited to, video embeddings, image embeddings, or code embeddings. In some cases, a vector database can ingest information, data, and/or metadata from other sources. Additionally, in one or more embodiments, a vector database can be associated with an entity.

As used herein, the term "data context" refers to computer data retrieved from a database or knowledge source related to a query and defining context for an entity. In some embodiments, the data context can correspond to a query as well as to portions or segments of content items associated with an entity and stored within a database. For example, in one or more cases, the personalized retrieval-augmented generation system can compare portions of vectorized segments of content items with a query embedding. Based on the comparison, the personalized retrieval-augmented generation system can determine one or more data contexts related to the query.

As used herein, the term "personalized response" refers to a response to a query generated by a RAG and/or large language model that is specific to an entity. For instance, a personalized response can be based on content items and other contextual data specific to an entity. To illustrate, a personalized response can consider the features, habits, and/or goals of an entity. Therefore, the personalized response is customized for each entity.

As used herein, the term "entity" refers to an enterprise, group, or individual with a digital account within a content management system. For example, an entity can be a company, firm, or unit that generates and/or stores records related to the company, firm, or unit. In some embodiments, an entity can refer to a department within an organization.

Further, as used herein, the term "large language model" refers to a machine learning model trained to perform computer tasks to generate or identify content items in response to trigger events (e.g., user interactions, such as text queries and button selections). In particular, a large language model can be a neural network (e.g., a deep neural network) with many parameters trained on large quantities of data (e.g., unlabeled text) using a particular learning technique (e.g., self-supervised learning). For example, a large language model can include parameters trained to generate model outputs (e.g., content items, summaries, or query responses) and/or to identify content items based on various contextual data, including graph information from a knowledge graph and/or historical user account behavior. In some cases, a large language model comprises a GPT model such as, but not limited to, ChatGPT.

Relatedly, as used herein, the term "machine learning model" refers to a computer algorithm or a collection of computer algorithms that automatically improve for a particular task through iterative outputs or predictions based on the use of data. For example, a machine learning model can utilize one or more learning techniques to improve accuracy and/or effectiveness. Example machine learning models include various types of neural networks, decision trees, support vector machines, linear regression models, and Bayesian networks. In some embodiments, the morphing interface system utilizes a large language machine-learning model in the form of a neural network.

Along these lines, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., content items or smart topic outputs) based on a plurality of inputs provided to the neural network. In some cases, a neural network refers to an algorithm (or set of algorithms) that implements deep learning techniques to model high-level abstractions in data. A neural network can include various layers, such as an input layer, one or more hidden layers, and an output layer that each perform tasks for processing data. For example, a neural network can include a deep neural network, a convolutional neural network, a transformer neural network, a recurrent neural network (e.g., an LSTM), a graph neural network, or a generative adversarial neural network. Upon training, such a neural network may become a large language model.

Additional detail regarding the field object generation system will now be provided with reference to the figures.

For example, FIG. 1 illustrates a schematic diagram of an example system environment for implementing a personalized retrieval-augmented generation system 106 in accordance with one or more embodiments. An overview of the personalized retrieval-augmented generation system 106 is described in relation to FIG. 1. Thereafter, a more detailed description of the components and processes of the personalized retrieval-augmented generation system 106 is provided in relation to the subsequent figures.

As shown, the environment includes server(s) 102, a client device 110, and a network 114. Each of the components of the environment can communicate via the network 114, and the network 114 may be any suitable network over which computing devices can communicate. Example networks are discussed in more detail below in relation to FIGS. 8-9.

As mentioned above, the example environment includes client device 110. The client device 110 can be one of a variety of computing devices, including a smartphone, a tablet, a smart television, a desktop computer, a laptop computer, a virtual reality device, an augmented reality device, or another computing device as described in relation to FIGS. 8-9. The client device 110 can communicate with the server(s) 102 and/or the database 108 via the network 114. For example, the client device 110 can receive user input from a user interacting with the client device 110 (e.g., via the client application 112) to, for instance, access, generate, modify, or share a content item, to collaborate with a co-user of a different client device, or to select a user interface element. In some cases, the client device 110 can receive input for a query or prompt. In addition, the personalized retrieval-augmented generation system 106 on the server(s) 102 can receive information relating to various interactions with content items and/or user interface elements based on the input received by the client device 110 (e.g., to access content items, input a query, or perform some other action).

As shown, the client device 110 can include a client application 112. In particular, the client application 112 may be a web application, a native application installed on the client device 110 (e.g., a mobile application, a desktop application, etc.), or a cloud-based application where all or part of the functionality is performed by the server(s) 102. Based on instructions from the client application 112, the client device 110 can present or display information, including a user interface for inputting prompts or queries into a large language model, displaying a personalized response from a large language model, or content items from the content management system 104 or from other network locations.

As illustrated in FIG. 1, the example environment also includes the server(s) 102. The server(s) 102 may generate, track, store, process, receive, and transmit electronic data, such as content items, computer code segments, text segments, data contexts, interface elements, interactions with content items, interactions with personalized responses, interactions with interface elements, and/or interactions between user accounts or client devices. For example, the server(s) 102 may receive data from the client device 110 in the form of an interaction with a selectable option indicating positive feedback to the personalized response. In some cases, the server(s) 102 may receive user input requesting a summary of one or more content items. In addition, the server(s) 102 can transmit data to the client device 110 in the form of a personalized response that includes a combination of data contexts relevant to the query and specific to an entity. Indeed, the server(s) 102 can communicate with the client device 110 to send and/or receive data via the network 114. In some implementations, the server(s) 102 comprise(s) a distributed server where the server(s) 102 include(s) a number of server devices distributed across the network 114 and located in different physical locations. The server(s) 102 can comprise one or more content servers, application servers, communication servers, web-hosting servers, machine learning server, and other types of servers.

As shown in FIG. 1, the server(s) 102 can also include the personalized retrieval-augmented generation system 106 and the database 108 as part of a content management system 104. The content management system 104 can communicate with the client device 110 to perform various functions associated with the client application 112 such as managing user accounts, embedding queries, managing a repository of vectorized content items and vectorized segments of content items, and facilitating user interaction with the content items. Indeed, the content management system 104 can include a network-based smart cloud storage system to manage, store, and maintain content items and related data across numerous entities, groups, and/or user accounts, including user accounts in collaboration with one another. In some embodiments, the personalized retrieval-augmented generation system 106 and/or the content management system 104 utilize the database 108 to store and access information such as content items, query embeddings, content item embeddings, vectorized content items, etc.

Although FIG. 1 depicts the personalized retrieval-augmented generation system 106 located on the server(s) 102, in some implementations, the personalized retrieval-augmented generation system 106 may be implemented by (e.g., located entirely or in part on) one or more other components of the environment. For example, the personalized retrieval-augmented generation system 106 may be implemented by the client device 110. For example, the client device 110 can download all or part of the personalized retrieval-augmented generation system 106 for implementation independent of, or together with, the server(s) 102.

In some implementations, though not illustrated in FIG. 1, the environment may have a different arrangement of components and/or may have a different number or set of components altogether. For example, the client device 110 may communicate directly with the personalized retrieval-augmented generation system 106, bypassing the network 114. As another example, the environment can include the database 108 located external to the server(s) 102 (e.g., in communication via the network 114), located on the server(s) 102 as illustrated in FIG. 1, and/or on the client device 110.

Figure 2:
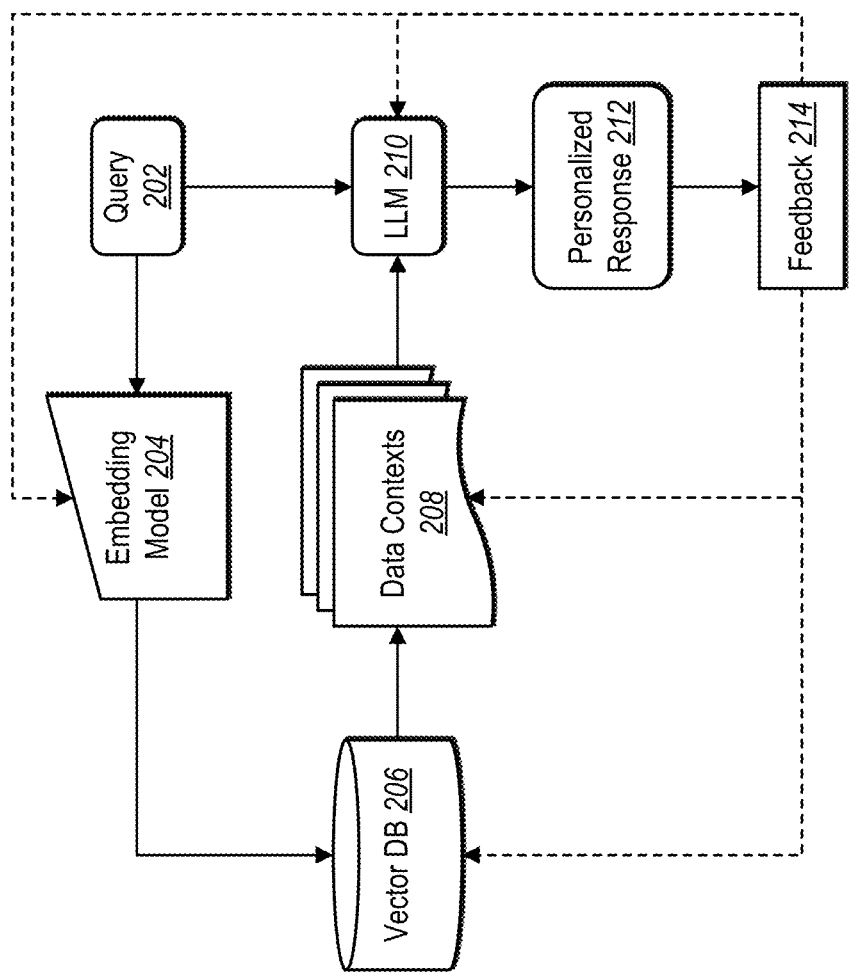
FIG. 2 illustrates an overview of a personalized retrieval-augmented generation system generating a personalized response and updating elements of a personalized retrieval-augmented generation model in accordance with one or more embodiments.

As mentioned above, in certain embodiments, the personalized retrieval-augmented generation system 106 can generate a personalized response for an entity by utilizing content items associated with the entity. For example, the personalized retrieval-augmented generation system 106 can generate a personalized response by inputting a query embedding and vectorized segments of content items associated with the entity into a large language model. FIG. 2 illustrates an exemplary workflow of a personalized retrieval-augmented generation system 106 generating a personalized response 212 by using an embedding model 204, a vector database 206, a large language model 210, and one or more content items associated with an entity in accordance with one or more embodiments.

As shown in FIG. 2, the personalized retrieval-augmented generation system 106 can receive a query 202 from an entity (e.g., from a client device operated by the entity). For example, the personalized retrieval-augmented generation system can receive input via a client device asking a question, requesting performance of an automated task (e.g., drafting an email, generating an image, generating a content summary, or generating a content item in some other form), and/or giving a specific direction. In some embodiments, the query 202 is a natural language question, such as a question asking for an annual report summary. In one or more implementations, the query 202 is a segment of code, such as a segment of code that indicates a request for programming assistance.

In some cases, the personalized retrieval-augmented generation system 106 can augment the query 202 prior to feeding it into the embedding model 204 so that the personalized retrieval-augmented generation system 106 improves the effectiveness of queries and prompts over time. For example, in one or more implementations, the personalized retrieval-augmented generation system 106 can recognize the context and/or relationship with the entity and certain tasks, other entities, content items, etc. and can utilize those relationships and/or contexts to improve the prompt. To illustrate, in one or more embodiments, the personalized retrieval-augmented generation system can extract (from a knowledge graph of the content management system 104) relational data between the entity and a project and can generate a query embedding that reflects the query and the relational data together.

As further shown in FIG. 2, in some embodiments, the personalized retrieval-augmented generation system can generate a query embedding by inputting the query 202 into an embedding model 204. In some cases, the embedding model 204 can generate a vector reflecting the semantic, relational, lexical, and/or textual meaning of the query 202. In some embodiments, the query 202 is not (solely) text-based (but instead includes an image, video, code, etc.) and the personalized retrieval-augmented generation system 106 can generate a query embedding by utilizing a different embedding model 204 based on the query 202 type (or multiple embedding models for a mixed query type and then combining the respective embeddings). For example, if the query includes an image, the personalized retrieval-augmented generation system 106 can utilize an embedding model 204 that embeds the image by flattening, autoencoding, or average pooling the image. In some cases, the query 202 includes content of multiple types or formats, and the personalized retrieval-augmented generation system 106 thus utilizes multiple embedding models and combines (e.g., concatenates) the content-type-specific embeddings of each model into a query embedding.

As further shown in FIG. 2, the personalized retrieval-augmented generation system 106 can store embeddings in a vector database 206. In particular, the personalized retrieval-augmented generation system 106 can store embeddings for various types of content items in the vector database 206. In some implementations, the personalized retrieval-augmented generation system 106 can associate stored content items with an entity, and when the entity makes a query, the personalized retrieval-augmented generation system 106 can generate a personalized response using the associated content items. In some cases, the vector database 206 can store content items and ingest data from other sources.

FIG. 2 further shows the personalized retrieval-augmented generation system 106 generating data contexts 208. In particular, the personalized retrieval-augmented generation system 106 can determine which content items to feed into the large language model 210 to generate a personalized response 212. For example, the personalized retrieval-augmented generation system 106 can compare a query embedding (from the embedding model 204) with content embeddings (e.g., vectorized segments of content items), user account embeddings, relationship embeddings, etc. stored in the vector database 206. Based on the comparison, the personalized retrieval-augmented generation system 106 can determine which data contexts 208 associated with the entity should be used in the large language model 210. For example, if the query asks for a sales report for a certain month, the personalized retrieval-augmented generation system 106 can compare the query embedding with content items in the vector database 206 and determine which content items include sales report data for that month. In some cases, the personalized retrieval-augmented generation system 106 can feed other data from other sources into the vector database 206. For example, the personalized retrieval-augmented generation system 106 could provide role model data from various accounts associated with the entity to the vector database 206.

As further shown in FIG. 2, the personalized retrieval-augmented generation system 106 can generate the personalized response 212 by utilizing a large language model 210. In particular, the personalized retrieval-augmented generation system 106 can input the query 202 and the data contexts 208 into the large language model 210. In some embodiments, the personalized retrieval-augmented generation system 106 can utilize a large language model 210 within the content management system 104. Alternatively, the personalized retrieval-augmented generation system 106 can use an external large language model 210 such as OpenAI or LAMA.

As further shown in FIG. 2, the personalized retrieval-augmented generation system can generate a personalized response 212 that is customized for the entity. For example, as mentioned above, the personalized retrieval-augmented generation system 106 can generate a personalized response that considers and utilizes content items specific to the entity. In one or more implementations, the personalized response 212 can take on various formats. For example, the personalized response 212 can be abstractive question answering, where the personalized retrieval-augmented generation system 106 provides a natural language response to a query in the form of a question. In some cases, the personalized response 212 can be semantic by using the intent and contextual meaning of the query 202.

As further shown in FIG. 2, the personalized retrieval-augmented generation system 106 can receive feedback 214 for the personalized response 212. In particular, the personalized retrieval-augmented generation system 106 can receive implicit or explicit feedback indicating the effectiveness, accuracy, and/or relevancy of the personalized response 212. As an example of implicit feedback, the personalized retrieval-augmented generation system 106 can determine whether a user account associated with the entity used the personalized response 212 or generated an additional query because the personalized response 212 from the initial query 202 was insufficient. As an example of explicit feedback, the personalized retrieval-augmented generation system 106 can receive an indication (e.g., a text-based indication or a selection of a feedback element) that the personalized response 212 was acceptable (e.g., a thumbs up) or unacceptable (e.g., a thumbs down).

In one or more embodiments, the personalized retrieval-augmented generation system 106 can improve the personalized response 212 by utilizing the feedback 214 to fine tune, enhance, and/or further personalize each of the components, individually or in combination, of the retrieval-augmented generation model. For example, the personalized retrieval-augmented generation system 106 can improve the performance of the embedding model by adjusting parameters for employing more effective embedding techniques for the entity. For example, the personalized retrieval-augmented generation system 106 can fine tune the embedding model 204 by decreasing the size and boosting the performance to match that of the initial embedding model 204. In some cases, the personalized retrieval-augmented generation system can fine tune the vector database 206 by adjusting how to (e.g., at what sizes, lengths and/or based on what factors to) partition content items within the vector database 206 so that the personalized retrieval-augmented generation system 106 generates a more accurate personalized response 212 for the entity. In some cases, the personalized retrieval-augmented generation system 106 can fine tune the large language model 210 by adapting parameters of the large language model 210 to the entity.

As mentioned above, in certain embodiments, the personalized retrieval-augmented generation system 106 generates query embeddings from queries. In particular, the personalized retrieval-augmented generation system 106 utilizes an embedding model to extract a query embedding from a query, where the model is selected from among a set of candidate models to match a data type of the query. FIGS. 3A-3B illustrate example diagrams of the personalized retrieval-augmented generation system 106 generating query embeddings and content item embeddings in accordance with one or more embodiments. In particular, FIG. 3A illustrates an example diagram of the personalized retrieval-augmented generation system 106 generating query embeddings in accordance with one or more embodiments.

As shown in FIG. 3A, the personalized retrieval-augmented generation system 106 can receive queries generated by an entity. In some instances, the personalized retrieval-augmented generation system 106 can receive different types of queries from the entity. For example, the personalized retrieval-augmented generation system 106 can receive a first query type 302 requesting a summary of several reports (or other content items) associated with the entity and a second query type 304 requesting coded language for generating a data structure (e.g., python table) specific to the entity. Indeed, the personalized retrieval-augmented generation system 106 can receive a variety of query types including, but not limited to, select queries, action queries, parameter queries, aggregate queries, question-answer queries, text classification queries, text generation queries, text editing queries, text summarization queries, text-to-image queries, image queriers, natural language queries, etc. In some embodiments, the query type can correspond to the subject of the query. For example, a query asking about financial information can be a financial query, or a query regarding medical information can be a medical query. In some cases, a query can have multiple query types.

As further shown in FIG. 3A, the personalized retrieval-augmented generation system 106 can further personalize the response to a query through query augmentation 306. In one or more embodiments, the personalized retrieval-augmented generation system 106 can perform query augmentation 306 by modifying the query (e.g., prompt) with an augmentation layer prior to imputing the query into an embedding model. Thus, query augmentation 306 enables the personalized retrieval-augmented generation system 106 to generate more accurate and/or relevant personalized responses for the entity.

In some embodiments, the personalized retrieval-augmented generation system 106 can augment the first query type 302 by augmenting (e.g., modifying) the language and/or structure of first query type 302. To illustrate, the personalized retrieval-augmented generation system 106 can receive the first query type 302 requesting a summary of yearly financial, productivity, and service goals specific to an entity. The personalized retrieval-augmented generation system 106 can augment the language of first query type 302 by generating a first subquery focusing on yearly financial goals, a second subquery focusing on yearly productivity goals, and a third subquery focusing on yearly service goals. The personalized retrieval-augmented generation system 106 can use the subqueries to generate the personalized response. Relatedly, query augmentation 306 can include adding information regarding dates, times, locations, and/or relationships to the first query type 302.

In some cases, the personalized retrieval-augmented generation system 106 can improve a query by fine-tuning and/or modifying the augmentation layer for an entity. For example, in some instances, the personalized retrieval-augmented generation system 106 can receive feedback about a personalized response. In certain embodiments, the personalized retrieval-augmented generation system 106 can change or further personalize the query augmentation 306 and query generated by an entity based on the feedback. To illustrate, the personalized retrieval-augmented generation system 106 can receive a query generated by a user account within the content management system and can generate a personalized response. In some embodiments, the personalized retrieval-augmented generation system 106 can receive feedback indicating that the generated response was not useful. Based on the feedback the personalized retrieval-augmented generation system 106 can generate a modified prompt by adding related phrases in the prompt. In some embodiments, the personalized retrieval-augmented generation system 106 can provide the modified query and the data context to a large language model and can generate a modified personalize response that is more relevant to the user account.

In some implementations, the personalized retrieval-augmented generation system 106 can augment the query based on the user account (e.g., entity). For example, in certain instances, the personalized retrieval-augmented generation system 106 can associate certain characteristics of a prompt with the user account of the content management system. Based on the characteristics of the prompt, the personalized retrieval-augmented generation system 106 can augment the query by restructuring, translating, and/or expanding the prompt in a manner unique to the user account. In one or more embodiments, the personalized retrieval-augmented generation system 106 performs query augmentation 306 through p-tuning. Relatedly, in some embodiments, the personalized retrieval-augmented generation system 106 can augment queries in manner that aligns with and reflects the evolutions and/or changes of the entity over time.

In some cases, the personalized retrieval-augmented generation system 106 can augment the query based on modification to various components of the personalized retrieval-augmented generation system 106. For example, as discussed in more detail below, the personalized retrieval-augmented generation system 106 can receive feedback regarding the quality, relevancy, and/or usefulness of the personalized response. In certain instances, the personalized retrieval-augmented generation system 106 can update various components (e.g., embedding model, large language model, etc.) based on the feedback and adjust the query based on the update to the one or more components of the personalized retrieval-augmented generation system 106.

For example, in one or more implementations, the personalized retrieval-augmented generation system 106 can detect a modification to the large language model and based on the modification to the large language model, augment the prompt provided to the large language model to include language and/or content that is tailored to the large language model after the modification.

As further indicated, the personalized retrieval-augmented generation system 106 can input queries into one or more embedding models. For instance, after query augmentation 306, the personalized retrieval-augmented generation system 106 can input different query types into corresponding embedding models. For example, as shown in FIG. 3A, the personalized retrieval-augmented generation system 106 can input the first query type 302 into a first embedding model 308 and the second query type 304 into a second embedding model 310. Indeed, in some cases, the personalized retrieval-augmented generation system 106 can identify the query type from the query and utilize the embedding model that corresponds to the query type. For example, in one or more implementations, the personalized retrieval-augmented generation system 106 can receive a query requesting translation of a report from one language to another. Based on identifying a language translation query type, the personalized retrieval-augmented generation system 106 can utilize a transformer-based model to generate a personalized response that translates the report specific to the entity.

In some embodiments, the personalized retrieval-augmented generation system 106 can receive multiple (e.g., additional) queries with different query types generated by the same entity. For example, the personalized retrieval-augmented generation system 106 can receive an additional query generated by the entity and identify an additional query type. In certain instances, the personalized retrieval-augmented generation system 106 can access a plurality of candidate embedding models (e.g., Word2Vec, GloVe, ELMO, BERT, GPT, FastText, etc.) and select the embedding model that corresponds to the additional query type. For example, based on a query requesting financial information, the personalized retrieval-augmented generation system 106 can select a financial embedding model. Additionally, in one or more embodiments, the personalized retrieval-augmented generation system 106 can include multilingual embedding models for translating queries and/or content items. In some cases, the personalized retrieval-augmented generation system 106 can utilize the multilingual embedding model and large language model to generate a personalized response in another language.

As further shown in FIG. 3A, the personalized retrieval-augmented generation system 106 can generate embeddings 312*a-b*. As used herein, the term "embedding" refers to a representation of data that captures features of the original data. For example, in one or more embodiments, an embedding can be a vector or numeric representation that reflects different features of data in a continuous space. To illustrate, a document embedding can be one or more vectorized segments representing the semantic meaning of the text within a document. In some embodiments, the embedding can be a Boolean or lexical representation of the of the features of the original data.

Figure 3:
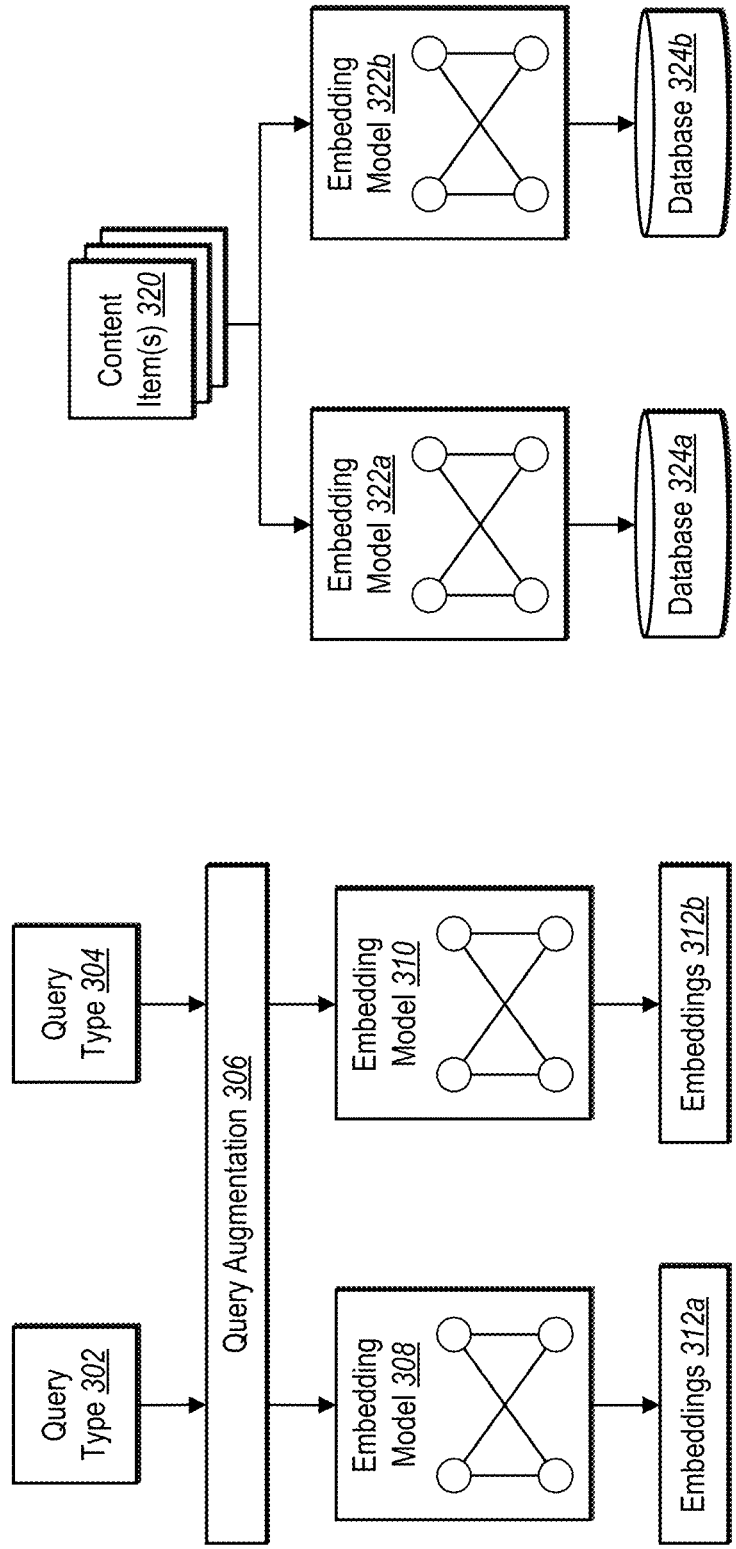
FIGS. 3A-3B illustrate an example diagram of the personalized retrieval-augmented generation system generating query embeddings and embeddings of content items in accordance with one or more embodiments.

Indeed, the personalized retrieval-augmented generation system 106 can generate various embeddings 312*a-b* based on the query and/or embedding model. For example, the personalized retrieval-augmented generation system 106 can generate word embeddings, document embeddings, graph embeddings, image embeddings, entity embeddings, etc. In some embodiments, the personalized retrieval-augmented generation system 106 can generate a query embedding that represents the content and/or task defined by the query in a continuous space. For instance, as shown in FIG. 3, the personalized retrieval-augmented generation system 106 can generate embedding 312*a* for the first query type 302 by utilizing the first embedding model 308 and embedding 312*b* for the second query type 304 by utilizing the second embedding model 310. Additionally, in one or more cases, the personalized retrieval-augmented generation system 106 can generate more than one embedding for a query. For example, based on the content and task defined by the query, the personalized retrieval-augmented generation system 106 can input the query into one or more embedding models and generate different query embeddings for the query.

As just discussed, in certain embodiments, the personalized retrieval-augmented generation system 106 generates query embeddings from queries. In particular, the personalized retrieval-augmented generation system 106 utilizes an embedding model to extract a query embedding from the query, where the model is selected from among a set of candidate models to match a data type of the query.

As further shown in FIG. 3B, the personalized retrieval-augmented generation system 106 can generate embeddings for content items and store the content item embeddings in one or more vector databases. As described in more detail below, in one or more embodiments, the personalized retrieval-augmented generation system 106 can compare the embeddings 312*a-b* (e.g., query embeddings) with vectorized segments and/or content embeddings of content items associated with the entity stored in one or more vector databases.

As shown in FIG. 3B, the personalized retrieval-augmented generation system 106 can input a content item(s) 320 into one or more embeddings models 322*a-b* to generate content item embeddings. For example, based on the theme, data, information, imagery, format, and/or text of the content item(s) 320, the personalized retrieval-augmented generation system 106 can select one or more embedding models that can generate one or more embeddings of the content item (e.g., content item embeddings). For instance, as illustrated in FIG. 3B, the personalized retrieval-augmented generation system 106 can input the content item(s) 320 into an embedding model 322*a* and/or embedding model 322*b*. For example, based on the content item(s) 320 comprising medical information, the personalized retrieval-augmented generation system 106 can select an embedding model 322*a* that supports embedding medical records. To further illustrate, based on the content item(s) 320 relating to financial information, the personalized retrieval-augmented generation system 106 can select an embedding model 322*b* that supports financial records. In some cases, the personalized retrieval-augmented generation system 106 can input the data content item(s) 320 into the embedding model 322*a* that supports embedding medical records and the embedding model 322*b* that supports financial records.

As further shown in FIG. 3B, the personalized retrieval-augmented generation system 106 can associate a database with each embedding model. For example, the database 324*a* can store content item embeddings generated by the embedding model 322*a* and the database 324*b* can store content item embeddings generated by the embedding model 322*b*.

In some cases, the personalized retrieval-augmented generation system 106 can have different databases that store the same type of content item embeddings but are associated with different types of information. For example, in one or more embodiments, a first database can store text-based content items and/or text-based content item embeddings relating to traffic information associated with the entity and a second database can store text-based content items and/or text-based content item embeddings related to productivity reports associated with the entity.

Figure 4:
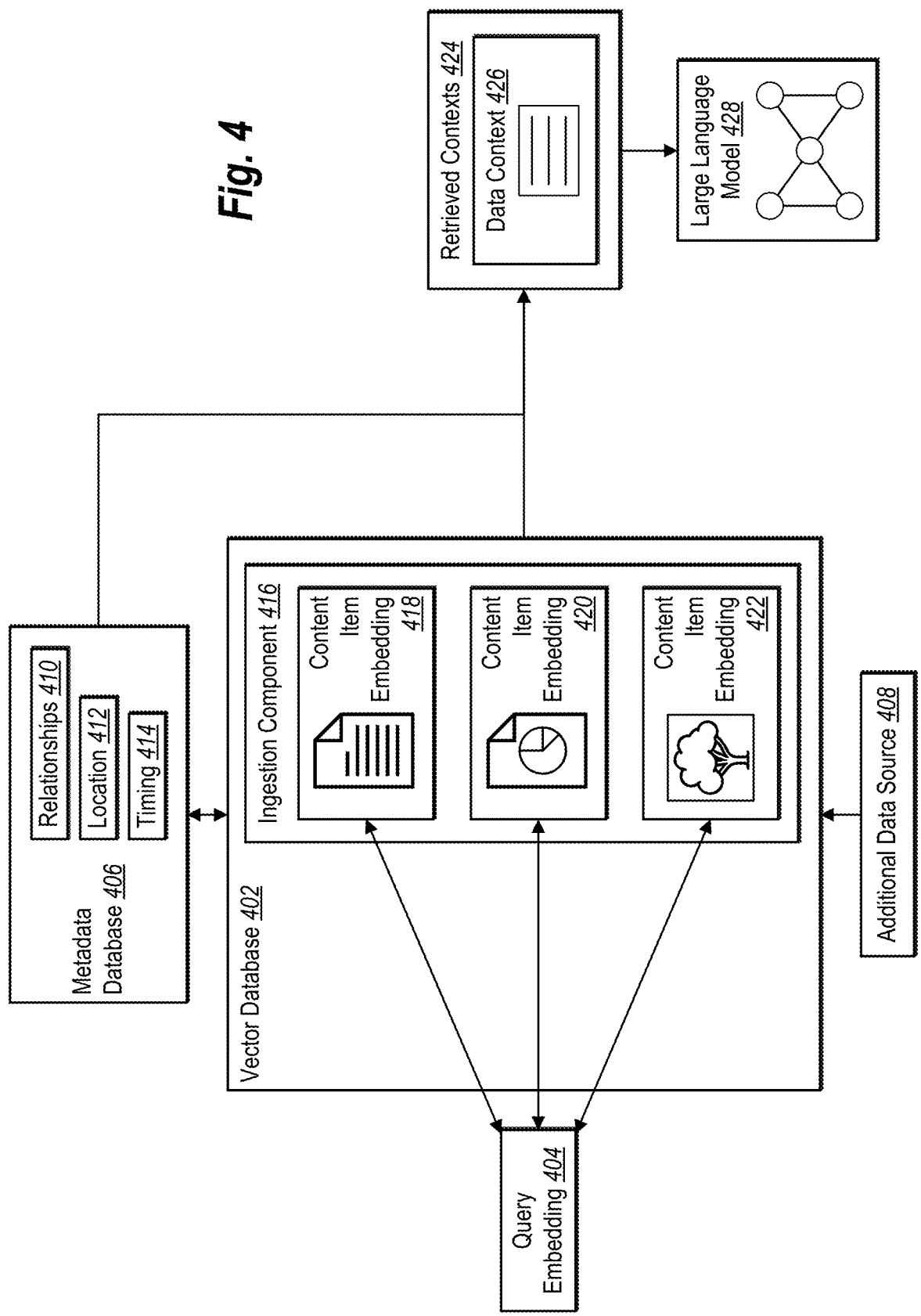
FIG. 4 illustrates the personalized retrieval-augmented generation system determining a data context specific to an entity by comparing a query embedding with vectorized segments in accordance with one or more embodiments.

As noted, in some embodiments, the personalized retrieval-augmented generation system 106 determines a data context specific to a query and corresponding to an entity. In particular, the personalized retrieval-augmented generation system 106 determines a data context from content items stored in the content management system 104 for an entity, where the content items also relate to the query. FIG. 4 illustrates the personalized retrieval-augmented generation system 106 determining a data context specific to an entity by comparing a query embedding with vectorized segments in accordance with one or more embodiments.

As shown in FIG. 4, the personalized retrieval-augmented generation system 106 can use a vector database 402 to house various content items and/or content item embeddings (e.g., content item embedding 418, content item embedding 420, and content item embedding 422) associated with a specific entity. In particular, in one or more embodiments, the personalized retrieval-augmented generation system 106 can store content item embeddings 418, 420, and 422 and/or vectorized segments of content items of the entity. In certain cases, the vector database 402 can store types of content items and/or one type of vectorized segments of content items. To illustrate, the vector database 402 can store text-based and non-text-based content items and a single content item embedding type of the text-based and non-text-based content items. In particular embodiments, the vector database 402 can store among the plurality of vectorized segments, a first vectorized segment generated from a text-based content item and a second vectorized segment generated from a non-text-based content item (e.g., an image or a video). As discussed above, in one or more embodiments, the personalized retrieval-augmented generation system 106 can store different content item embeddings in different vector databases associated with the utilized embedding model and/or type of content item embeddings.

As illustrated in FIG. 4, in one or more embodiments, the personalized retrieval-augmented generation system can determine how to partition content items into vectorized segments by utilizing an ingestion component 416. For example, in some cases, the personalized retrieval-augmented generation system 106 can identify factors associated with an entity and based on those factors pull segments of contents items with the ingestion component 416. Additionally, the personalized retrieval-augmented generation system 106 can determine the size or degree of granularity of the segments of content items with the ingestion component 416. As FIG. 4 illustrates, the personalized retrieval-augmented generation system 106 can access an ingestion component 416 within the vector database 402. As used herein, the term "ingestion component" refers to a model that can process, transfer, and/or load data from one or more sources to a database. In certain embodiments, the ingestion component 416 can include computer logic for segmenting (e.g., chunking) the content items. For instance, in certain instances, personalized retrieval-augmented generation system 106 can utilize the ingestion component 416 to generate one or more vectorized segments for content items (e.g., content item embedding 418, content item embedding 420, and content item embedding 422) associated with the entity. For example, the personalized retrieval-augmented generation system 106 can apply the ingestion component 416 comprising computer logic for segmenting content items in the vector database 402. In some embodiments, the ingestion component 416 is external to the vector database 402.

Additionally, in some embodiments, the ingestion component 416 can identify features associated with the content items (e.g., content item embedding 418, content item embedding 420, and content item embedding 422), vector database 402, and/or entity and determine partitions for segmenting the content items. For example, using the ingestion component 416, the personalized retrieval-augmented generation system 106 can determine partitions for segmenting the content items based on the size and/or structure of the content item. In some embodiments, the personalized retrieval-augmented generation system 106 can determine partitions based on the memory of the vector database 402, topic transitions in content items (e.g., to segment an item into topic-specific segments), data distribution needs, system throughput abilities, latency optimization, or processing orders. In certain cases, the personalized retrieval-augmented generation system 106 can partition the content items into one or more segments based on the determined partitions.

Moreover, in certain instances, the personalized retrieval-augmented generation system 106 can partition content items based on the large language model 428. For example, in certain cases, large language model 428 can have a context window restriction. The personalized retrieval-augmented generation system 106 can determine the partitions for segmenting content items based on the size of the context window restriction.

In some cases, the personalized retrieval-augmented generation system 106 can generate content item embeddings 418, 420, 422 comprising vectorized segments of corresponding content items. In particular, the personalized retrieval-augmented generation system 106 can input the segments of the content items into an embedding model. Indeed, in one or more cases, the personalized retrieval-augmented generation system 106 can extract an embedding from a segment of the one or more segments by utilizing the embedding model. In certain embodiments, the personalized retrieval-augmented generation system 106 can extract the embedding by selecting and applying an embedding model that matches the embedding model used to generate the query embedding 404.

As further shown in FIG. 4, the personalized retrieval-augmented generation system 106 can utilize the vectorized segments of content items and the query embedding 404 to generate data contexts. In particular, the personalized retrieval-augmented generation system 106 can compare the query embedding 404 with the vectorized segments of content items. To illustrate, in some cases, the personalized retrieval-augmented generation system 106 can compare the query embedding 404 and the vectorized segments of content items (e.g., content item embedding 418, content item embedding 420, and content item embedding 422) by determining semantic similarities between the query embedding 404 and the vectorized segments of the content items (e.g., content item embedding 418, content item embedding 420, and content item embedding 422). In certain instances, the personalized retrieval-augmented generation system 106 determines semantic similarities by measuring the distance between the query embedding 404 and vectorized segments of the content items (e.g., content item embedding 418, content item embedding 420, and content item embedding 422) in a vector space. For example, the personalized retrieval-augmented generation system 106 can determine the distance between the query embedding 404 and vectorized segments of the content items (e.g., content item embedding 418, content item embedding 420, and content item embedding 422) by utilizing a cosine distance, Euclidean distance, or dot product. Based on the semantic similarity (e.g., distance) between the query embedding 404 and vectorized segments of content items (e.g., content item embedding 418, content item embedding 420, and content item embedding 422), the personalized retrieval-augmented generation system 106 can determine to include the vectorized segment of one or more specific content items in a data context 426 of the retrieved contexts 424. In some embodiments, based on the entity, the personalized retrieval-augmented generation system 106 can compare the query embedding 404 with all of the vectorized segments of the content items by performing a full table scan within the vector database 402. In one or more embodiments, the personalized retrieval-augmented generation system 106 can compare the query embedding 404 with the vectorized segments of the content items by performing a lexical search or exact-match search, that looks for exact matches of words and/or numbers, of the vectorized segments of the content items in the vector database 402.

Additionally, in one or more embodiments, the personalized retrieval-augmented generation system 106 can generate one or more data contexts to input into the large language model 428 along with the query. Relatedly, in some cases, the personalized retrieval-augmented generation system can generate, for a single query, one or more data contexts with content item embeddings stored in different databases. For instance, in one implementation, the personalized retrieval-augmented generation system 106 can input a single query into two different embedding models to generate two different query embeddings. The personalized retrieval-augmented generation system 106 can compare the two different query embeddings with content item embeddings in two different databases. Subsequently, the personalized retrieval-augmented generation system 106 can generate one or more data contexts from the content items in the two different databases and provide those data contexts to a large language model to generate a personalized response for the entity. In some cases, the personalized retrieval-augmented generation system 106 can utilize multiple embedding models, databases, and/or large language models to generate a personalized response for the entity.

Additionally, in some embodiments, the personalized retrieval-augmented generation system 106 can receive feedback regarding the personalized response and fine-tune or modify the vector database 402 and/or the vectorized segments of the content items (e.g., content item embedding 418, content item embedding 420, and content item embedding 422) based on the feedback. For instance, the personalized retrieval-augmented generation system 106 can increase the granularity of vectorized segments of content items (e.g., content item embedding 418, content item embedding 420, and content item embedding 422) based on express feedback data indicating that the generated response was not accurate. In some cases, the personalized retrieval-augmented generation system 106 can update the vector database 402 by modifying the length of the plurality of vectorized segments so as to improve the feedback of subsequent personalized responses. For instance, based on implicit feedback data indicating that the entity submitted a subsequent query with slightly different language and/or that the resulting personalized response was unselected for a threshold period of time, the personalized retrieval-augmented generation system 106 can increase (or decrease) the segment length of the vectorized segments to improve the feedback of subsequent personalized responses.

As FIG. 4 indicates, in certain cases, the personalized retrieval-augmented generation system 106 can utilize other sources of data to include in the data context 426. For example, the personalized retrieval-augmented generation system 106 can determine the intent of the query by accessing metadata of the content items and/or associated with the entity. For example, based on the content of the query, the personalized retrieval-augmented generation system 106 can pull metadata from a metadata database 406 instead of (or in addition to) pulling information from the vector database 402. Indeed, the metadata database 406 can store metadata for content items and/or for vectorized segments of content items, where different metadata are associated with or labeled as corresponding to the items or segments.

In some instances, metadata can reflect information associated with or generated by an entity. For example, metadata can reflect relationships 410, location(s) 412, and/or the timing 414 associated with content items associated with the entity. For instance, the personalized retrieval-augmented generation system 106 can store metadata about the time of receiving email and who received the email in the metadata database 406. To further illustrate, the personalized retrieval-augmented generation system 106 can receive a query asking for details about an upcoming flight to Nashville. While generated a personalized response about the flight to Nashville, the personalized retrieval-augmented generation system 106 can access metadata regarding the time and date of the upcoming flight to Nashville and utilize the metadata to select relevant information (e.g., vectorized segments of content items) to include in the data context along with a vectorized segment of a flight receipt.

As further indicated in FIG. 4, the personalized retrieval-augmented generation system 106 can pull or utilize data from an additional data source 408 for generating a personalized response. In particular, the personalized retrieval-augmented generation system 106 can pull data from a data source external to the vector database 402 and/or content management system and include that in the data context 426. In some embodiments, the personalized retrieval-augmented generation system 106 can use the additional data to generate an additional data context. In certain instances, the personalized retrieval-augmented generation system 106 can provide the additional data context along with data context 426 to the large language model 428 for generating the personalized response.

As illustrated in FIG. 4, the personalized retrieval-augmented generation system 106 can determine one or more data contexts to provide to the large language model 428. For instance, based on the comparison of the query embedding and the vectorized segments of content items (e.g., content item embedding 418, content item embedding 420, and content item embedding 422), the personalized retrieval-augmented generation system 106 can generate multiple data contexts to provide to the large language model 428. In one or more embodiments, the personalized retrieval-augmented generation system 106 can determine the data context 426 by selecting a subset of vector segments extracted from the stored content items that define entity behavior relating to the query within the content management system (and/or accompanying metadata). For instance, based on a query asking for sales data for a specified sales group within an organization, the personalized retrieval-augmented generation system 106 can extract a subset of vector segments from sales records associated with the specified sales group.

As further illustrated in FIG. 4, the personalized retrieval-augmented generation system 106 can select the vectorized segments of content items and include those vectorized segments in the data context 426. In some embodiments, the personalized retrieval-augmented generation system 106 compares content item embedding 418, content item embedding 420, and content item embedding 422 with the query embedding 404. In some cases, based on vectorized segments of a content item having semantic similarity, a keyword match, or Boolean match to the query embedding 404, the personalized retrieval-augmented generation system 106 can generate the data context 426 to provide to the large language model 428 for generating the personalized response. In some embodiments, the personalized retrieval-augmented generation system 106 can provide more than one data context to the large language model 428.

In some embodiments, the personalized retrieval-augmented generation system 106 does not compare the query embedding 404 with certain vectorized segments of content items based on permissions or privacy considerations. For instance, in one or more implementations, only a limited number of user accounts or groups of use accounts are granted access to certain content items based on their credentials and/or permissions. In such instances, the personalized retrieval-augmented generation system 106 can determine an ingestion permissibility for a vectorized segment from among the plurality of vectorized segments stored in the vector database 402 based on permission data associated with an entity. In some embodiments, permission data includes credentials, security clearance, or passwords associated with an entity. Indeed, the personalized retrieval-augmented generation system 106 can grant access to the private content item by requesting and receiving credentials and/or a password of the entity. Based on the ingestion permissibility, the personalized retrieval-augmented generation system 106 can determine a secure data context specific to the entity by comparing the query embedding 404 and the vectorized segment. In certain cases, the personalized retrieval-augmented generation system 106 can provide the secure data context and the query to the large language model 428 for generating a secure personalized response.

Figure 5:
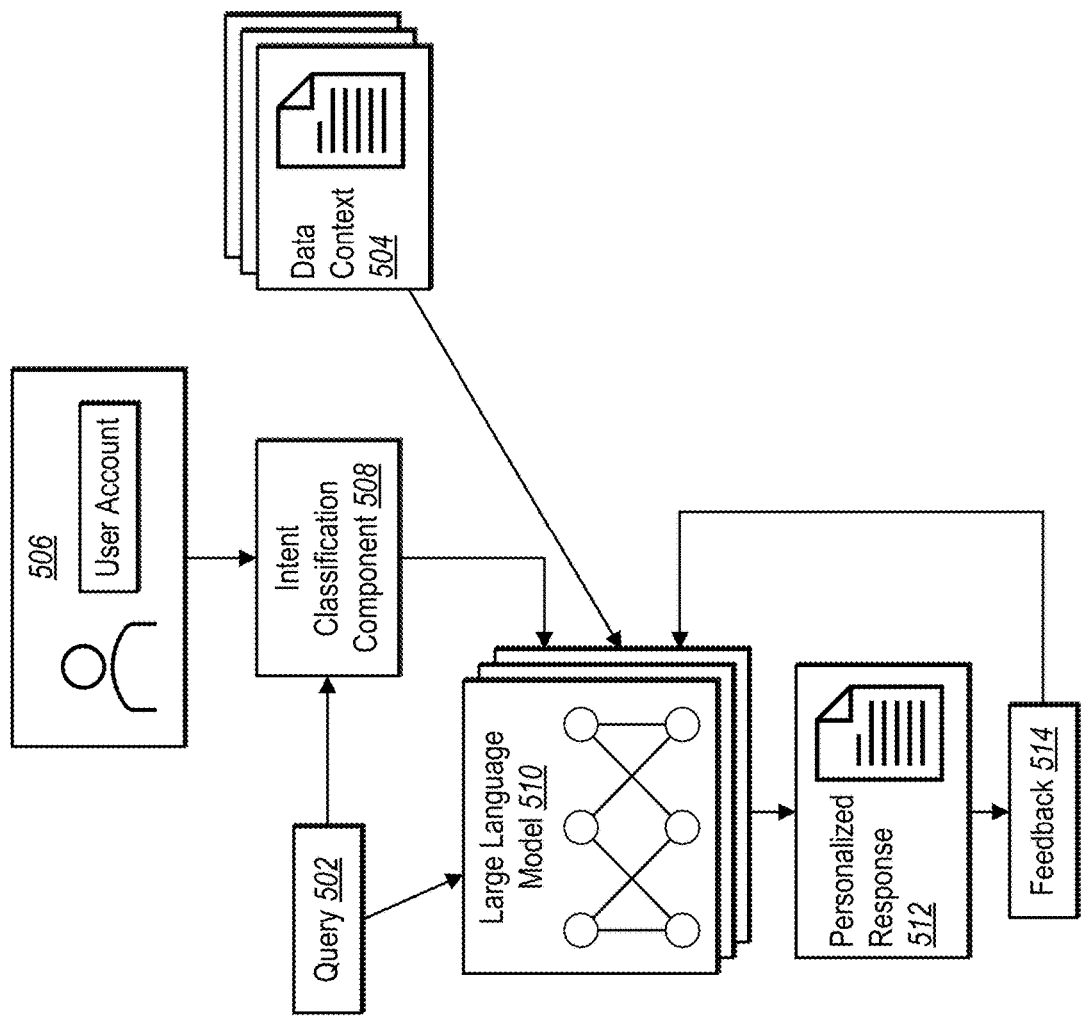
FIG. 5 illustrates the personalized retrieval-augmented generation system providing the data context and the query to a large language model for generating a personalized response in accordance with one or more embodiments.

As mentioned, in some embodiments, the personalized retrieval-augmented generation system 106 generates a personalized response using a large language model to process a data context. In particular, the personalized retrieval-augmented generation system 106 provides a query and its data context to a large language model to generate a personalized response unique to the entity providing the query. FIG. 5 illustrates the personalized retrieval-augmented generation system providing a data context and a query to a large language model for generating a personalized response in accordance with one or more embodiments.

As indicated in FIG. 5, the large language model 510 can interpret the query 502 and data context 504 to generate a personalized response 512 with text, instructions, information, and/or data that is specifically tailored to the entity. In one or more embodiments, the personalized retrieval-augmented generation system 106 can select the large language model 510 based on the query type, the vectorized segments (e.g., content embeddings) stored in a vector database, the intent of the query, and/or the entity. For example, if the majority of content items include document embeddings, the personalized retrieval-augmented generation system 106 can utilize a transformer-based large language model while generating the personalized response 512. The personalized retrieval-augmented generation system 106 can thus select the large language model 510 from among a set of candidate large language models.

As further shown in FIG. 5, the personalized retrieval-augmented generation system 106 can generate the personalized response 512 by determining the intent of the query 502 generated by a user account 506 (e.g., entity) associated with the content management system. For instance, as indicated in FIG. 5, the personalized retrieval-augmented generation system 106 can utilize an intent classification component 508 to determine the intent of the query 502. Indeed, in one or more embodiments, the personalized retrieval-augmented generation system 106 can determine if the intent of the query 502 relates to navigating, retrieving, or performing an action related to the content management database based on the content of the query 502. In some embodiments, the personalized retrieval-augmented generation system 106 can utilize metadata and other data associated with the user account 506 to further determine the intent of the query. For example, based on the time, date, and location of the query 502, the personalized retrieval-augmented generation system 106 can determine the intent of the query 502.

In certain implementations, the personalized retrieval-augmented generation system 106 can utilize the intent of the query 502 to select an appropriate large language model 510 for the query 502. In particular, the personalized retrieval-augmented generation system 106 can determine the intent of the query 502 by utilizing the intent classification component 508. Indeed, the personalized retrieval-augmented generation system 106 can use the intent classification component 508 to identify the content, metadata, and/or additional data related to the query 502 and determine the intent or goal of the query 502.

The personalized retrieval-augmented generation system 106 can use the intent of the query 502 to select a large language model 510 that will generate a relevant and effective personalized response 512 specific to the user account 506. To illustrate, the personalized retrieval-augmented generation system 106 can receive the query 502 from the user account 506 requesting a structured query language ("SQL") query for identifying a list of subscribers paying for a service provided by the company of the user account 506. The intent classification component 508 can analyze the content of the query 502 and determine that the intent of the query 502 is generating SQL language for retrieving subscription information. Indeed, based on the intent of the query 502, the personalized retrieval-augmented generation system 106 can select a transformer-based large language model to generate the personalized response 512 with the relevant SQL language. In some cases, the personalized retrieval-augmented generation system 106 can store previous queries generated by the entity.

In some embodiments, the personalized retrieval-augmented generation system 106 can train the intent classification component 508 to determine the intent of the query 502. For example, the personalized retrieval-augmented generation system 106 can analyze a training set of queries and/or prior queries generated by the entity and determine the intent of the query 502 based on feedback 514 of the personalized response 512.

As FIG. 5 illustrates, the personalized retrieval-augmented generation system 106 can generate a personalized response 512. For example, the personalized retrieval-augmented generation system 106 can generate texts, reports, images, translations, data extractions, instructions, and/or recommendations specific to an entity. In certain embodiments, the personalized retrieval-augmented generation system 106 can generate the personalized response 512 in various formats. For example, in certain cases, the query 502 can include instructions on the formatting of the personalized response 512, and the personalized retrieval-augmented generation system 106 can generate the personalized response 512 according to the formatting specified in the query 502. To illustrate, if a query 502 requests a summary of sales figures in bullet point formatting, the personalized retrieval-augmented generation system 106 can generate a document of compiled sales data in a bullet point format.

As further shown in FIG. 5, the personalized retrieval-augmented generation system 106 can receive feedback 514 from the entity associated with the content management system regarding the personalized response 512. In particular, the personalized retrieval-augmented generation system 106 can receive feedback 514 regarding the approval, disapproval, and/or use of the personalized response 512. For example, the personalized retrieval-augmented generation system 106 can receive implicit and/or explicit feedback regarding the personalized response 512 from the user account 506.

In some embodiments, receiving explicit feedback can include receiving an indication from a client device associated with the user of the approval or disapproval of the personalized response 512. For example, in certain cases, the personalized retrieval-augmented generation system 106 can provide for display one or more selectable elements for providing feedback 514 to the personalized response 512. The personalized retrieval-augmented generation system 106 can receive feedback 514 by receiving a selection of a selectable element from among the one or more selectable elements. To illustrate, in one or more embodiments, the personalized retrieval-augmented generation system 106 can provide for display a first selectable element indicating that the personalized response 512 was helpful and a second selectable element indicating that the personalized response 512 was not helpful. In response to receiving a selection indicating that the personalized response 512 was not helpful, the personalized retrieval-augmented generation system 106 can provide for display additional selectable elements requesting further context as to why the personalized response 512 was not helpful. For example, the personalized retrieval-augmented generation system 106 can provide for display additional selectable elements asking if the answer was not applicable or if the data context 504 was incorrect. Thus, the personalized retrieval-augmented generation system 106 can receive feedback 514 by receiving a selection of the first or second selectable elements.

In one or more implementations, the personalized retrieval-augmented generation system 106 can receive implicit feedback or feedback data of the personalized retrieval-augmented generation system 106 by monitoring the use and/or selection of the personalized response 512 and other interactions with the personalized retrieval-augmented generation system 106. For example, in some cases, the personalized retrieval-augmented generation system 106 can detect a selection of the personalized response 512 via user interaction at the client device. To illustrate, the personalized retrieval-augmented generation system 106 can detect downloading, printing, copying, and/or transmission of the personalized response 512 via a user interaction at the client device. In some embodiments, the personalized retrieval-augmented generation system 106 can update components of the personalized retrieval-augmented generation system 106 based on the implicit feedback. For example, based on implicit feedback data, the personalized retrieval-augmented generation system 106 can update the vector database by modifying the plurality of vectorized segments so that selections of subsequent personalized responses increase. Indeed, in some embodiments, the personalized retrieval-augmented generation system 106 can change the partitions of the vectorized segments to improve the relevancy of the personalized response 512

In some embodiments, the personalized retrieval-augmented generation system 106 can receive implicit feedback by monitoring the content of queries made after generating the personalized response 512. For example, the personalized retrieval-augmented generation system 106 can receive implicit feedback indicating the disapproval of the personalized response 512 by receiving a subsequent query asking about a similar task or by detecting a lack of interaction with the personalized response 512 at the client device.

As further shown in FIG. 5, based on the feedback 514, the personalized retrieval-augmented generation system 106 can modify several components (e.g., embedding model, vector database, data contexts, large language model, query augmentation) of the system to improve the accuracy, relevance, and/or quality of the personalized response 512 specific to the user account 506 (e.g., entity). For example, based on feedback 514 to the personalized response 512, the personalized retrieval-augmented generation system 106 can modify or fine-tune the large language model 510 or utilize a different large language model 510. Indeed, based on the feedback 514, the personalized retrieval-augmented generation system 106 can adjust parameters of the large language model 510 so that the personalized response 512 is unique and specific to the user account 506 (e.g., entity). In some embodiments, the personalized retrieval-augmented generation system 106 can detect modifications to the large language model 510 and modify other components of the personalized retrieval-augmented generation system 106. For example, based on the modification to the large language model 510, the personalized retrieval-augmented generation system 106 can augment the query 502 provided to the large language model 510 to include language tailored for the large language model 510 after the modification. For example, the personalized retrieval-augmented generation system 106 can detect a change to the architecture of the large language model 510, based on the change in architecture, the personalized retrieval-augmented generation system 106 can include more related terms in the query 502 to aid the large language model 510 in identifying complex data patterns.

As indicated above, the personalized retrieval-augmented generation system 106 can generate a system with each component specifically attuned to the needs, characteristics, and/or changes of an entity and the content items associated with the entity. Indeed, the personalized retrieval-augmented generation system 106 can generate a personalized system specific to each user account 506 (e.g., individual) or group within a corporation. For example, the personalized retrieval-augmented generation system 106 can modify and/or fine-tune queries, embeddings, embedding models, data contexts, and/or large language models to generate personalized responses for individual user accounts, small teams, or entire corporations. In some embodiments, the personalized retrieval-augmented generation system 106 can modify systems for different entity according to a learning rate associated with the entity. For example, one entity might work in a fast-paced industry and be willing to take on greater risk to adapt to the changes of that industry by utilizing a higher learning rate. Alternatively, the personalized retrieval-augmented generation system 106 can modify one or more additional components of a system of a different entity according to a different learning rate. For example, a different entity might not need to drastically update or modify the large language model 510 or embedding model of their system and thus utilize a different learning rate. In some embodiments, the personalized retrieval-augmented generation system 106 can determine the learning rate based on features and/or input of the entity.

Figure 6:
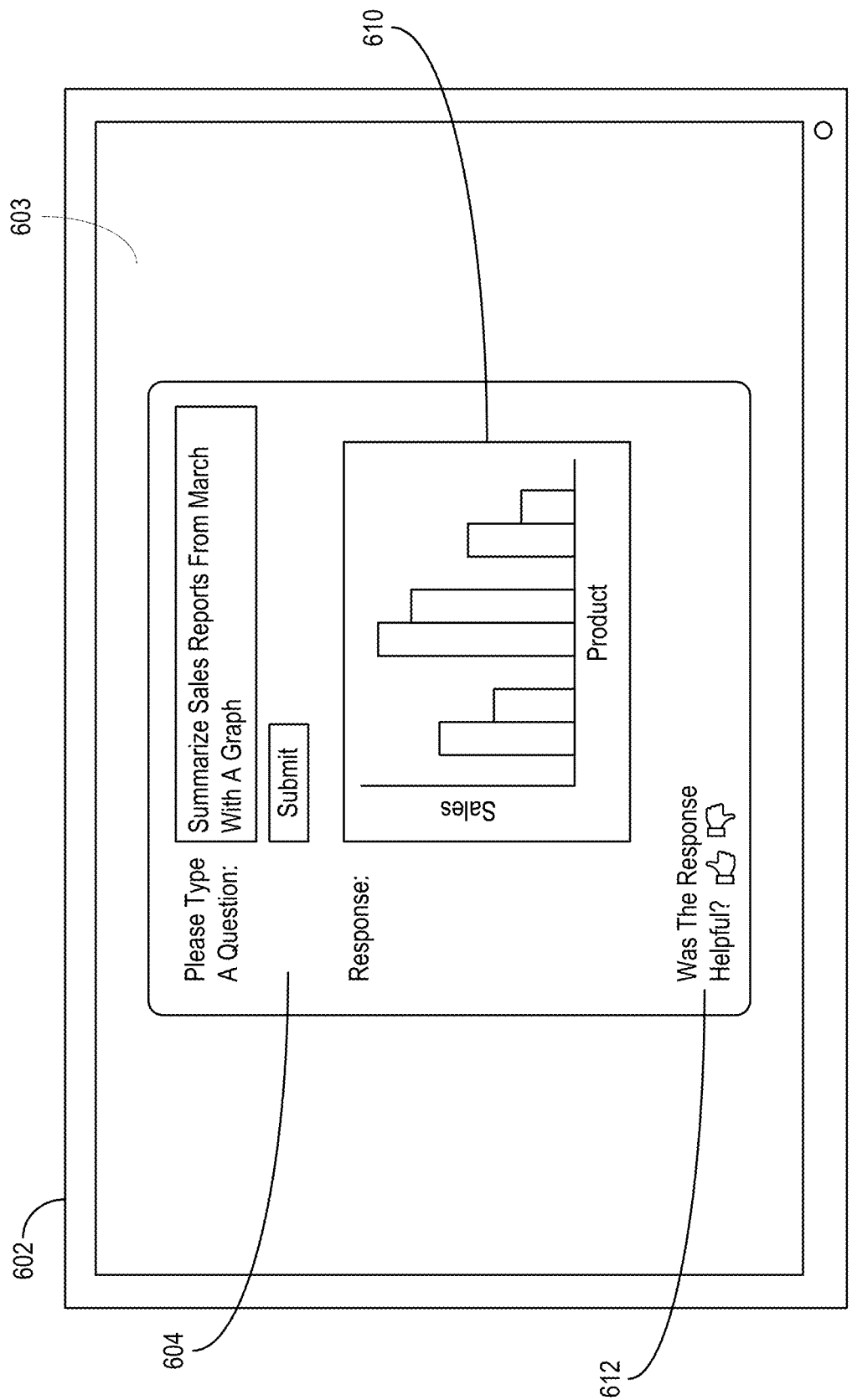
FIG. 6 illustrates an example user interface for providing a personalized response for display on a client device in accordance with one or more embodiments.

FIG. 6 illustrates an example user interface for providing a personalized response for display on a client device in accordance with one or more embodiments. FIG. 6 illustrates a graphical user interface 603 of a client device 602 associated with a user account within the content management system. As shown in FIG. 6, the personalized retrieval-augmented generation system 106 can provide for display the query 604 generated by the user account. The personalized retrieval-augmented generation system 106 can further provide for display on the graphical user interface 603 the personalized response 610 performing the action indicated by the query 604.

In particular, as indicated in FIG. 6, the personalized retrieval-augmented generation system 106 can generate the personalized response 610, comprising a graph summarizing sales reports for March, by determining a data context from the content items stored for the entity. In particular, the personalized retrieval-augmented generation system 106 can compare a query embedding representing the query 604 "summarize sales reports from March with a graph," with vectorized segments of content items specific to the entity. Based on the comparison, the personalized retrieval-augmented generation system 106 can generate the data context comprising relevant data and/or information related to the sales reports for the month of March. In some embodiments, the personalized retrieval-augmented generation system 106 can provide the data context and query 604, to a large language model. Based on the formatting directive provided in the query, action posed by the query, and the data context, the personalized retrieval-augmented generation system 106 can generate the personalized response 610 of a graph summarizing the sales reports for March utilizing the large language model. In some embodiments, the personalized retrieval-augmented generation system 106 can provide for display a question and one or more selectable elements 612 for receiving feedback about the accuracy, relevance, or usefulness of the personalized response 610.

FIGS. 1-6, the corresponding text, and the examples provide a number of different systems, methods, and non-transitory computer readable media for generating a personalized response specific to an entity by utilizing an embedding model and database to generate a data context and a large language model to process a query and the data context for the entity within a content management system. In addition to the foregoing, embodiments can also be described in terms of flowcharts comprising acts for accomplishing a particular result. For example, FIG. 7 illustrates a flowchart of an example sequence of acts in accordance with one or more embodiments.

Figure 7:
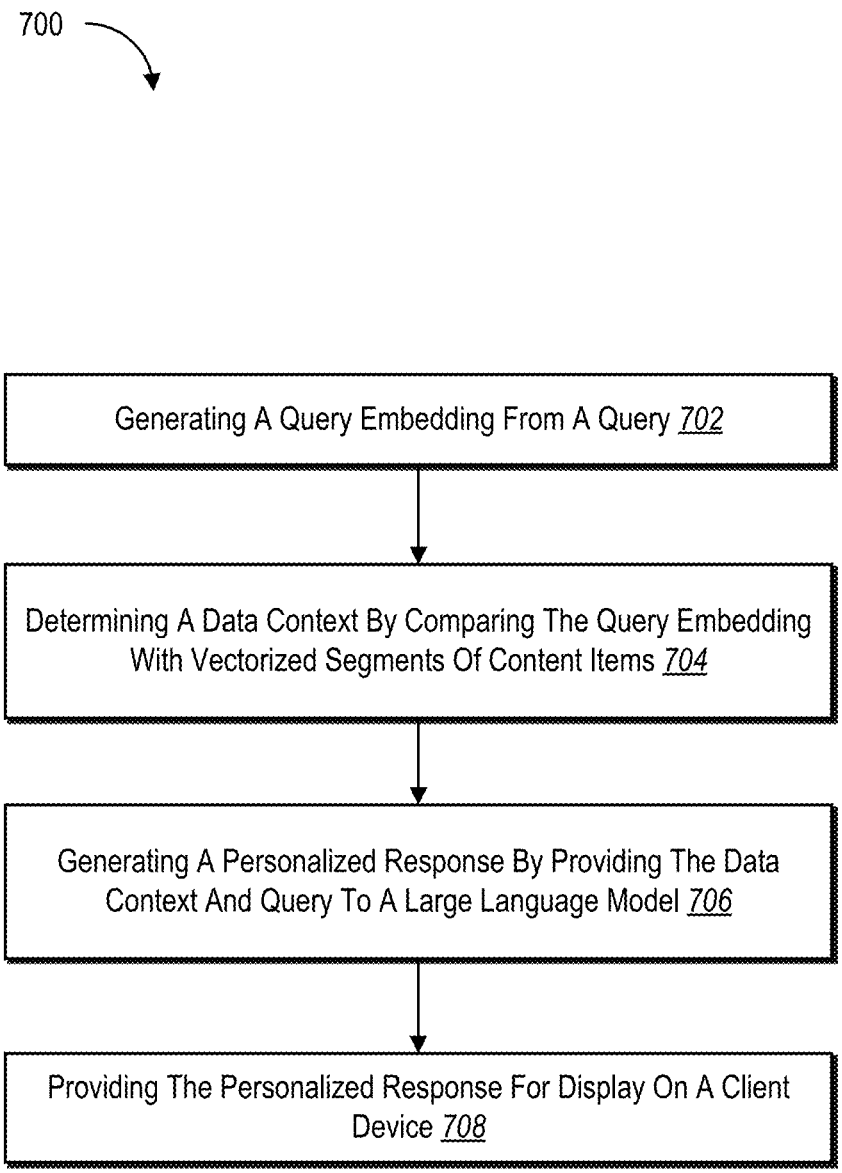
FIG. 7 illustrates an example series of acts for generating a personalized response and updating elements of a personalized retrieval-augmented generation model in accordance with one or more embodiments.

FIG. 7 illustrates an example series of acts 700 for generating a personalized response and updating elements of a personalized retrieval-augmented generation model in accordance with one or more embodiments. In one or more embodiments, the series of acts 700 can include an act 702 of generating a query embedding from a query; an act 704 of determining a data context by comparing the query embedding with vectorized segments of content items; an act 706 of generating a personalized response by providing the data context and query to a large language model; and an act 708 of providing the personalized response for display on a client device.

In one or more cases, the series of act 700 can include an act of generating, from a query generated by an entity associated with a content management system, a query embedding comprising a vector representation of the query. The series of acts can also include an act of determining, from a database storing a plurality of vectorized segments of content items associated with the entity, a data context specific to the entity by comparing the query embedding and the vectorized segments. The series of acts can further include an act of providing the data context and the query to a large language model for generating a personalized response informed by the data context specific to the entity. Additionally, the series of acts 700 can include an act of providing the personalized response for display on a client device associated with the entity.

In one or more embodiments, the series of acts 700 can include an act of generating a modified query by augmenting language included in the query using a query augmentation layer. The series of acts 700 can also include an act of providing the modified query with the data context to the large language model to generate a modified personalized response.

In one or more embodiments generating the query embedding can include an act of identifying a query type from the query generated by the entity associated with the content management system and utilizing an embedding model corresponding to the query type to generate the query embedding.

In some cases, the series of acts 700 can include an act of identifying an additional query type from an additional query generated by the entity associated with the content management system. The series of acts 700 can also include selecting, from among a plurality of candidate embedding models corresponding to respective query types, an additional embedding model based on the additional query type.

In certain implementations, the series of acts 700 can include an act of receiving, from the client device, feedback data indicating approval or disapproval of the personalized response specific to the entity, wherein the feedback data defines one or more of a selection of an interface element or entry of text for analysis by the large language model.

In one or more embodiments, the series of acts 700 can include the act of updating, based on the feedback data, the database by modifying the plurality of vectorized segments to change segment length for improving feedback of subsequent personalized responses.

In certain cases, the series of acts 700 can include an act where comparing the query embedding and the vectorized segments includes determining a semantic similarity between the query embedding and a vectorized segment from among the plurality of vectorized segments and selecting the vectorized segment to include as part of the data context for providing to the large language model based on the semantic similarity.

In some embodiments, the series of acts 700 includes an act of generating, from a query generated by an entity associated with a content management system, a query embedding comprising a vector representation of the query. The series of acts 700 can include an act of determining, from a vector database storing a plurality of vectorized segments of content items associated with the entity, a data context specific to the entity by comparing the query embedding and the plurality of vectorized segments. Additionally, the series of acts 700 can include an act of providing the data context and the query to a large language model for generating a personalized response informed by the data context specific to the entity. Moreover, the series of acts 700 can include the act of providing the personalized response specific to the entity for display on a client device associated with the entity.

In one or more implementations the series of acts 700 can include an act that causes the system to compare the query embedding and the plurality of vectorized segments by determining, based on permission data associated with the entity, an ingestion permissibility for a vectorized segment from among the plurality of vectorized segments stored in the vector database. The series of acts 700 can include an act of based on the ingestion permissibility, determining a secure data context specific to the entity by comparing the query embedding and the vectorized segment. The series of acts 700 can further include an act of providing the secure data context and the query to the large language model for generating a secure personalized response.

In one or more implementations, the series of acts 700 can include an act of storing, among the plurality of vectorized segments within the vector database, a first vectorized segment generated from a text-based content item and a second vectorized segment generated from a non-text-based content item.

In certain embodiments, the series of acts 700 can include an act of receiving implicit feedback data from the client device by detecting a selection of the personalized response via user interaction at the client device. Additionally, the series of acts 700 can include an act of updating, based on the implicit feedback data, the vector database by modifying the plurality of vectorized segments to increase selections of subsequent personalized responses.

In some cases, the series of acts 700 can include an act of generating a vectorized segment to include within the plurality of vectorized segments by determining, utilizing an ingestion component comprising computer logic for segmenting content items, partitions for segmenting a content item stored for the entity within the content management system. The series of acts 700 can further include an act of partitioning the content item into one or more segments according to the partitions. The series of acts 700 can also include an act of extracting an embedding from a segment of the one or more segments utilizing an embedding model.

In certain implementations, the series of acts 700 can include an act of determining, utilizing an intent classification component, an intent of the query generated by the entity associated with the content management system. The series of acts 700 can also include an act of selecting the large language model based on the intent of the query.

In one or more cases, the series of acts 700 can include an act of detecting a modification to the large language model. The series of acts 700 can also include based on the modification to the large language model, augmenting a prompt provided to the large language model to include language tailored for the large language model after the modification.

In certain embodiments, the series of acts 700 can include an act of generate, from a query generated by an entity associated with a content management system, a query embedding with an embedding model. In some cases, the series of acts 700 can further include an act of determining, from a vector database storing a plurality of vectorized segments of content items associated with the entity, a data context specific to the entity by comparing the query embedding and the vectorized segments. Additionally, the series of acts 700 can include an act of providing the data context and the query embedding to a large language model for generating a personalized response informed by the data context specific to the entity. The series of acts 700 and also include an act of providing the personalized response for display on a client device associated with the entity.

The series of acts 700 can include an act of providing, for display on the client device, one or more selectable elements for providing feedback to the personalized response. Moreover, the series of acts 700 can include an act of receiving feedback data for the personalized response by receiving a selection of a selectable element from among the one or more selectable elements. The series of acts 700 can further include an act of modifying the embedding model based on the feedback data.

In one or more embodiments, the series of acts 700 can include an act of determining the data context by selecting, from the plurality of vectorized segments, a subset of vectorized segments extracted from stored content items that define entity behavior relating to the query within the content management system.

In some cases, the series of acts 700 can include an act of modifying one or more of the embedding model or the vector database according to a learning rate associated with the entity. The series of acts 700 can further include an act of modify one or more of an additional embedding model or an additional vector database according to a different learning rate associated with a different entity.

In certain implementations, the series of acts 700 can include an act of based on the query, determining an additional data context from an additional data source external to the content management system. Additionally, the series of acts 700 can include an act of providing the additional data context to the large language model for generating the personalized response.

In some embodiments, the series of acts 700 can include an act of determining an intent of the query by accessing metadata for the content items stored in a metadata database.

The components of the personalized retrieval-augmented generation system 106 can include software, hardware, or both. For example, the components of the personalized retrieval-augmented generation system 106 can include one or more instructions stored on a computer-readable storage medium and executable by processors of one or more computing devices. When executed by one or more processors, the computer-executable instructions of the personalized retrieval-augmented generation system 106 can cause a computing device to perform the methods described herein. Alternatively, the components of the personalized retrieval-augmented generation system 106 can comprise hardware, such as a special purpose processing device to perform a certain function or group of functions. Additionally or alternatively, the components of the personalized retrieval-augmented generation system 106 can include a combination of computer-executable instructions and hardware.

Furthermore, the components of the personalized retrieval-augmented generation system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the personalized retrieval-augmented generation system 106 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
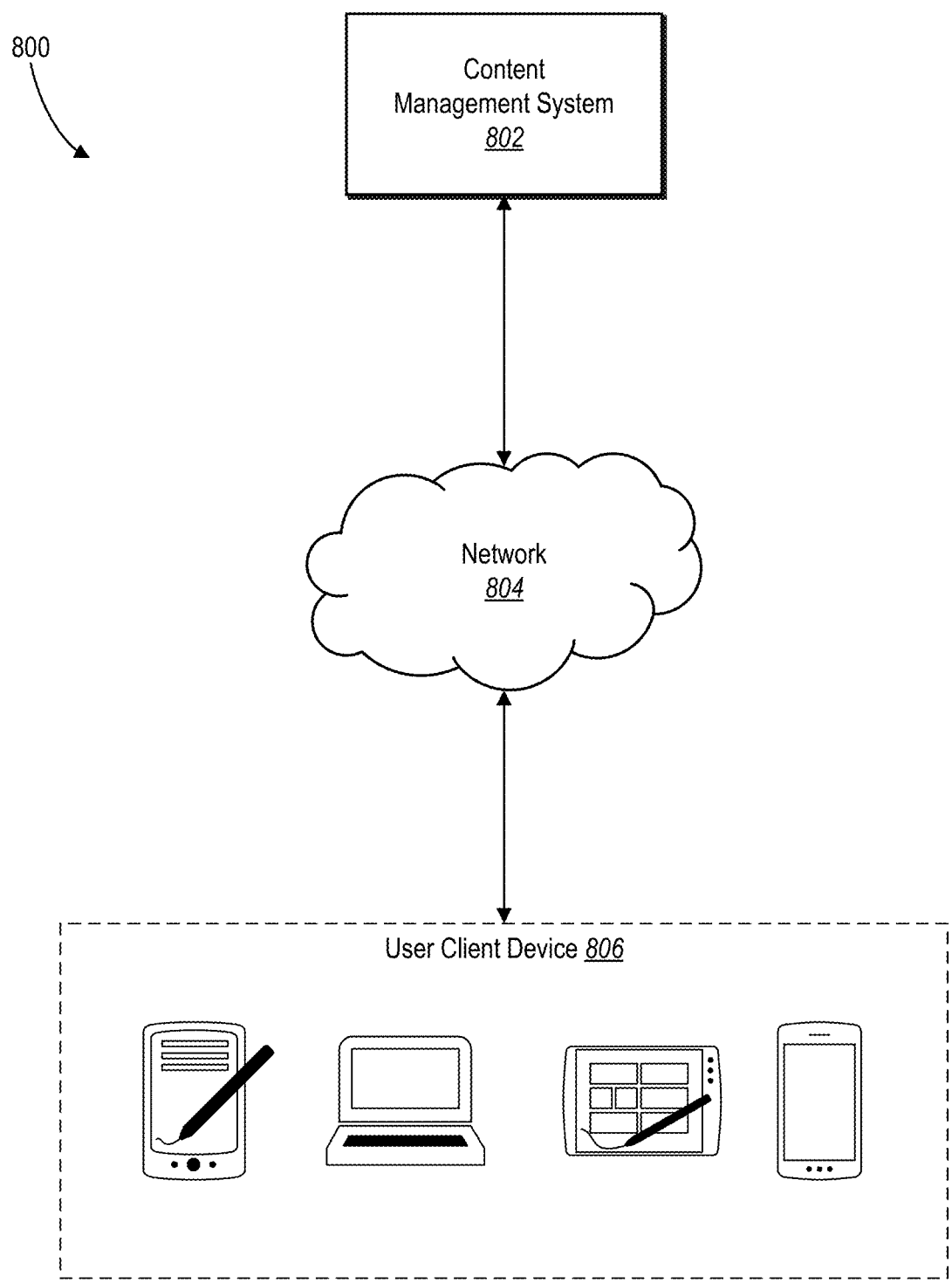
FIG. 8 illustrates a schematic diagram illustrating an exemplary environment within which one or more implementations of the personalized retrieval-augmented generation system can be implemented in accordance with one or more embodiments.

FIG. 8 is a schematic diagram illustrating environment 800 within which one or more implementations of the personalized retrieval-augmented generation system 106 can be implemented. For example, the personalized retrieval-augmented generation system 106 may be part of a content management system 802 (e.g., the content management system 104). Content management system 802 may generate, store, manage, receive, and send digital content (such as digital content items). For example, content management system 802 may send and receive digital content to and from client device of client devices 806 by way of network 804. In particular, content management system 802 can store and manage a collection of digital content. Content management system 802 can manage the sharing of digital content between computing devices associated with a plurality of users. For instance, content management system 802 can facilitate a user sharing a digital content with another user of content management system 802.

In particular, content management system 802 can manage synchronizing digital content across multiple client devices 806 associated with one or more users. For example, a user may edit digital content using a client device of the client device 806. The content management system 802 can cause client device of the client devices 806 to send the edited digital content to content management system 802. Content management system 802 then synchronizes the edited digital content on one or more additional computing devices.

In addition to synchronizing digital content across multiple devices, one or more implementations of content management system 802 can provide an efficient storage option for users that have large collections of digital content. For example, content management system 802 can store a collection of digital content on content management system 802, while the client device of the client devices 806 only stores reduced-sized versions of the digital content. A user can navigate and browse the reduced-sized versions (e.g., a thumbnail of a digital image) of the digital content on client device of the client devices 806. In particular, one way in which a user can experience digital content is to browse the reduced-sized versions of the digital content on client device of client devices 806.

Another way in which a user can experience digital content is to select a reduced-size version of digital content to request the full- or high-resolution version of digital content from content management system 802. In particular, upon a user selecting a reduced-sized version of digital content, client device of client devices 1406 sends a request to content management system 802 requesting the digital content associated with the reduced-sized version of the digital content. Content management system 802 can respond to the request by sending the digital content to client device of client devices 806. Client device of client devices 806, upon receiving the digital content, can then present the digital content to the user. In this way, a user can have access to large collections of digital content while minimizing the amount of resources used on client device of client devices 806.

client device of client devices 806 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. client device of client devices 806 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 804.

Network 804 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client device of client devices 806 may access content management system 802.

Figure 9:
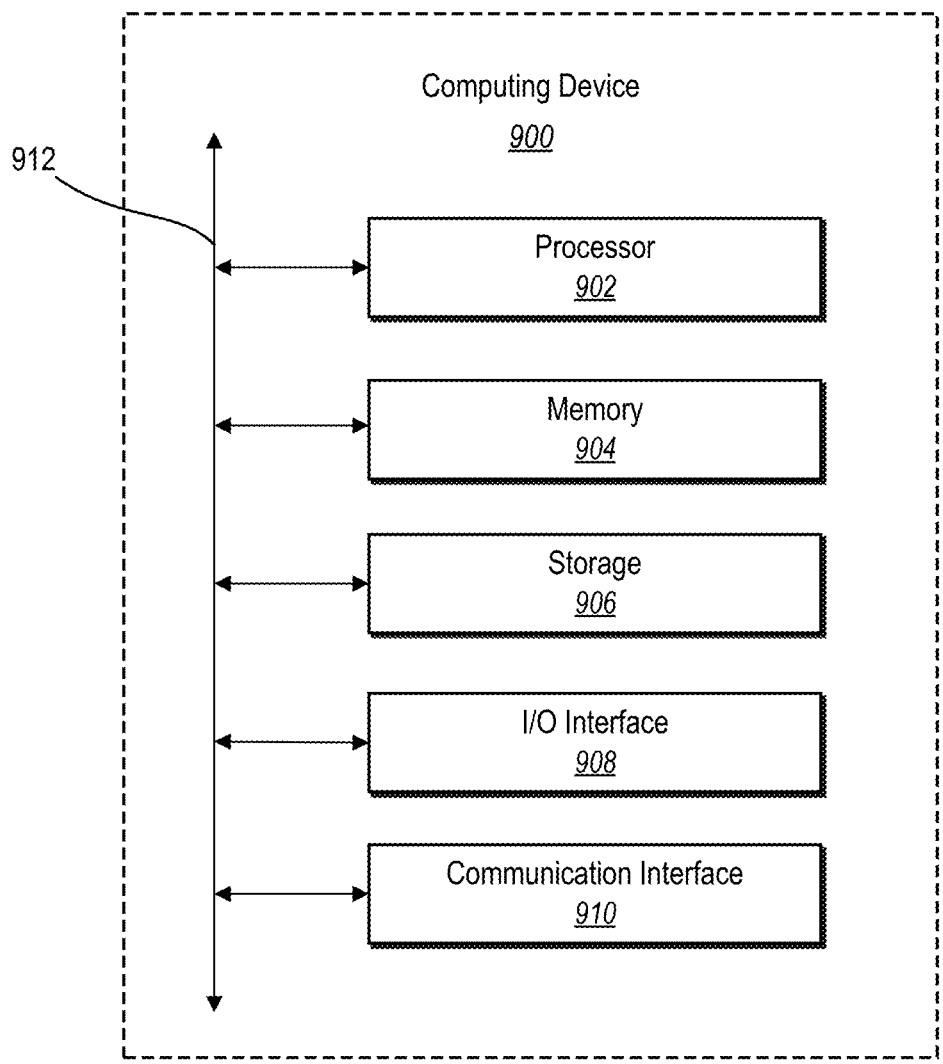
FIG. 9 illustrates a block diagram of an exemplary computing device (e.g., the server(s) and/or the client device)

FIG. 9 illustrates a block diagram of exemplary computing device 900 (e.g., the server(s) 102 and/or the client device 110) that may be configured to perform one or more of the processes described above. One will appreciate that server(s) 102 and/or the client device 110 may comprise one or more computing devices such as computing device 900. As shown by FIG. 9, computing device 900 can comprise processor 902, memory 904, storage device 906, I/O interface 908, and communication interface 910, which may be communicatively coupled by way of communication infrastructure 912. While an exemplary computing device 900 is shown in FIG. 9, the components illustrated in FIG. 9 are not intended to be limiting. Additional or alternative components may be used in other implementations. Furthermore, in certain implementations, computing device 900 can include fewer components than those shown in FIG. 9. Components of computing device 900 shown in FIG. 9 will now be described in additional detail.

In particular implementations, processor 902 includes hardware for executing instructions, such as those making up a computer program. As an example and not by way of limitation, to execute instructions, processor 902 may retrieve (or fetch) the instructions from an internal register, an internal cache, memory 904, or storage device 906 and decode and execute them. In particular implementations, processor 902 may include one or more internal caches for data, instructions, or addresses. As an example and not by way of limitation, processor 902 may include one or more instruction caches, one or more data caches, and one or more translation lookaside buffers (TLBs). Instructions in the instruction caches may be copies of instructions in memory 904 or storage device 906.

Memory 904 may be used for storing data, metadata, and programs for execution by the processor(s). Memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 904 may be internal or distributed memory.

Storage device 906 includes storage for storing data or instructions. As an example and not by way of limitation, storage device 906 can comprise a non-transitory storage medium described above. Storage device 906 may include a hard disk drive (HDD), a floppy disk drive, flash memory, an optical disc, a magneto-optical disc, magnetic tape, or a Universal Serial Bus (USB) drive or a combination of two or more of these. Storage device 906 may include removable or non-removable (or fixed) media, where appropriate. Storage device 906 may be internal or external to computing device 900. In particular implementations, storage device 906 is non-volatile, solid-state memory. In other implementations, Storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 908 allows a user to provide input to, receive output from, and otherwise transfer data to and receive data from computing device 900. I/O interface 908 may include a mouse, a keypad or a keyboard, a touch screen, a camera, an optical scanner, network interface, modem, other known I/O devices or a combination of such I/O interfaces. I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 908 is configured to provide graphical data to a display for presentation to a user. The graphical data may be representative of one or more graphical user interfaces and/or any other graphical content as may serve a particular implementation.

Communication interface 910 can include hardware, software, or both. In any event, communication interface 910 can provide one or more interfaces for communication (such as, for example, packet-based communication) between computing device 900 and one or more other computing devices or networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 912 may include hardware, software, or both that couples components of computing device 900 to each other. As an example and not by way of limitation, communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating, from a query generated by an entity account associated with a content management system hosting a plurality of personalized retrieval-augmented generation systems (RAGs) personalized in part by data contexts of content items stored in the content management system for respective entity accounts, a query embedding comprising a vector representation of the query by utilizing an embedding model that is part of a personalized RAG specific to the entity account from among the plurality of personalized RAGs;
determining a plurality of vectorized segments according to a size of a context window of the personalized RAG specific to the entity account;
determining, utilizing the personalized RAG to perform a retrieval augmentation specific to the entity account by accessing a database storing the plurality of vectorized segments of content items indicated by the size of the context window associated with the entity account, a data context specific to the entity account by comparing the query embedding and the plurality of vectorized segments specific to the entity account;

generating a response from the retrieval augmentation by providing the data context specific to the entity account and the query to a large language model within the personalized RAG, prompting the large language model to generate a personalized response informed by the data context specific to the entity account; and providing the personalized response specific to the entity account for display on a client device associated with the entity account.

2. The computer-implemented method of claim 1, further comprising:

generating a modified query by augmenting language included in the query using a query augmentation layer; and providing the modified query with the data context to the large language model to generate a modified personalized response.

3. The computer-implemented method of claim 1, wherein generating the query embedding further comprises:

identifying a query type from the query generated by the entity account associated with the content management system; and utilizing the embedding model corresponding to the query type to generate the query embedding.

4. The computer-implemented method of claim 3, further comprising:

identifying an additional query type from an additional query generated by the entity account associated with the content management system; and selecting, from among a plurality of candidate embedding models corresponding to respective query types, an additional embedding model based on the additional query type.

5. The computer-implemented method of claim 1, further comprising:

receiving, from the client device, feedback data indicating approval or disapproval of the personalized response specific to the entity account, wherein the feedback data defines one or more of a selection of an interface element or entry of text for analysis by the large language model.

6. The computer-implemented method of claim 5, further comprising:

updating, based on the feedback data, the database by modifying the plurality of vectorized segments to change segment length for improving feedback of subsequent personalized responses.

7. The computer-implemented method of claim 1, wherein comparing the query embedding and the plurality of vectorized segments further comprises:

determining a semantic similarity between the query embedding and a vectorized segment from among the plurality of vectorized segments; and selecting the vectorized segment to include as part of the data context for providing to the large language model based on the semantic similarity.

8. A system comprising:

at least one processor; and a non-transitory computer readable medium comprising instructions that, when executed by the at least one processor, cause the system to:

generate, from a query generated by an entity account associated with a content management system hosting a plurality of personalized retrieval-augmented generation systems (RAGs) personalized in part by data contexts of content items stored in the content management system for respective entity accounts, a query embedding comprising a vector representation of the query by utilizing an embedding model that is part of a personalized RAG specific to the entity account from among the plurality of personalized RAGs;

determine a plurality of vectorized segments according to a size of a context window of the personalized RAG specific to the entity account;

determine, utilizing the personalized RAG to perform a retrieval augmentation specific to the entity account by accessing a vector database storing the plurality of vectorized segments indicated by the size of the context window associated with the entity account, a data context specific to the entity account by comparing the query embedding and the plurality of vectorized segments specific to the entity account;

generate a response from the retrieval augmentation by providing the data context specific to the entity account and the query to a large language model within the personalized RAG, prompting the large language model to generate a personalized response informed by the data context specific to the entity account; and provide the personalized response specific to the entity account for display on a client device associated with the entity account.

9. The system of claim 8, further comprising instructions that, when executed by the at least one processor, cause the system to compare the query embedding and the plurality of vectorized segments further by:

determining, based on permission data associated with the entity account, an ingestion permissibility for a vectorized segment from among the plurality of vectorized segments stored in the vector database;

based on the ingestion permissibility, determining a secure data context specific to the entity account by comparing the query embedding and the vectorized segment; and providing the secure data context and the query to the large language model for generating a secure personalized response.

10. The system of claim 8, further comprising instructions that, when executed by the at least one processor, cause the system to:

store, among the plurality of vectorized segments within the vector database, a first vectorized segment generated from a text-based content item and a second vectorized segment generated from a non-text-based content item.

11. The system of claim 8, further comprising instructions that, when executed by the at least one processor, cause the system to:

receive implicit feedback data from the client device by detecting a selection of the personalized response via user interaction at the client device; and update, based on the implicit feedback data, the vector database by modifying the plurality of vectorized segments to increase selections of subsequent personalized responses.

12. The system of claim 8, further comprising instructions that, when executed by the at least one processor, cause the system to generate a vectorized segment to include within the plurality of vectorized segments by:

determining, utilizing an ingestion component comprising computer logic for segmenting content items, partitions for segmenting a content item stored for the entity account within the content management system;

partition the content item into one or more segments according to the partitions; and extract an embedding from a segment of the one or more segments utilizing the embedding model.

13. The system of claim 8, further comprising instructions that, when executed by the at least one processor, cause the system to:

determine, utilizing an intent classification component, an intent of the query generated by the entity account associated with the content management system; and select the large language model based on the intent of the query.

14. The system of claim 8, further comprising instructions that, when executed by the at least one processor, cause the system to:

detect a modification to the large language model; and based on the modification to the large language model, augment a query provided to the large language model to include language tailored for the large language model after the modification.

15. A non-transitory computer readable medium comprising instructions that, when executed by at least one processor, cause the at least one processor to:

generate, from a query generated by an entity account associated with a content management system hosting a plurality of personalized retrieval-augmented generation systems (RAGs) personalized in part by data contexts of content items stored in the content management system for respective entity accounts, a query embedding by utilizing an embedding model that is part of a personalized RAG specific to the entity account from among the plurality of personalized RAGs;

determine a plurality of vectorized segments according to a size of a context window of the personalized RAG specific to the entity account;

determine, utilizing the personalized RAG to perform a retrieval augmentation specific to the entity account by accessing a vector database storing the plurality of vectorized segments of content items indicated by the size of the context window associated with the entity account, a data context specific to the entity account by comparing the query embedding and the plurality of vectorized segments specific to the entity account;

generate a response from the retrieval augmentation by providing the data context specific to the entity account and the query embedding to a large language model within the personalized RAG, prompting the large language model to generate a personalized response informed by the data context specific to the entity account; and provide the personalized response specific to the entity account for display on a client device associated with the entity account.

16. The non-transitory computer readable medium of claim 15, further comprising instructions that, when executed by the at least one processor, cause the at least one processor to:

provide, for display on the client device, one or more selectable elements for providing feedback to the personalized response;

receive feedback data for the personalized response by receiving a selection of a selectable element from among the one or more selectable elements; and modify the embedding model based on the feedback data.

17. The non-transitory computer readable medium of claim 15, further comprising instructions that, when executed by the at least one processor, cause the at least one processor to determine the data context by selecting, from the plurality of vectorized segments, a subset of vectorized segments extracted from stored content items that define entity account behavior relating to the query within the content management system.

18. The non-transitory computer readable medium of claim 15, further comprising instructions that, when executed by the at least one processor, cause the at least one processor to:

modify one or more of the embedding model or the vector database according to a learning rate associated with the entity account; and modify one or more of an additional embedding model or an additional vector database according to a different learning rate associated with a different entity account.

19. The non-transitory computer readable medium of claim 15, further comprising instructions that, when executed by the at least one processor, cause the at least one processor to:

based on the query, determine an additional data context from an additional data source external to the content management system; and provide the additional data context to the large language model for generating the personalized response.

20. The non-transitory computer readable medium of claim 15, further comprising instructions that, when executed by the at least one processor, cause the at least one processor to:

determine an intent of the query by accessing metadata for the content items stored in a metadata database.

\* \* \* \* \*